(12) United States Patent
Tanaka

(10) Patent No.: US 11,392,517 B2
(45) Date of Patent: Jul. 19, 2022

(54) ACCESS CONTROL METHOD, BUS SYSTEM, AND SEMICONDUCTOR DEVICE

(71) Applicant: Sony Corporation, Tokyo (JP)

(72) Inventor: Masao Tanaka, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 493 days.

(21) Appl. No.: 15/502,751

(22) PCT Filed: Aug. 31, 2015

(86) PCT No.: PCT/JP2015/074640
§ 371 (c)(1),
(2) Date: Feb. 8, 2017

(87) PCT Pub. No.: WO2016/039198
PCT Pub. Date: Mar. 17, 2016

(65) Prior Publication Data
US 2017/0235688 A1   Aug. 17, 2017

(30) Foreign Application Priority Data

Sep. 10, 2014 (JP) .............................. JP2014-183777

(51) Int. Cl.
*G06F 13/16* (2006.01)
*G06F 12/0815* (2016.01)

(52) U.S. Cl.
CPC ...... *G06F 13/1689* (2013.01); *G06F 13/1673* (2013.01); *G06F 12/0815* (2013.01); *G06F 2212/1024* (2013.01); *G06F 2212/621* (2013.01)

(58) Field of Classification Search
CPC ............ G06F 13/1689; G06F 13/1673; G06F 12/0815; G06F 2212/1024; G06F 2212/621
See application file for complete search history.

(56) References Cited

U.S. PATENT DOCUMENTS

| | | | | |
|---|---|---|---|---|
| 5,805,837 | A | * | 9/1998 | Hoover ................. G06F 13/362 710/110 |
| 7,194,566 | B2 | | 3/2007 | Wingard et al. |
| 2002/0019900 | A1 | * | 2/2002 | Kim ...................... G06F 13/362 710/240 |
| 2002/0099896 | A1 | * | 7/2002 | Farmwald .............. G11C 29/88 710/305 |
| 2003/0208553 | A1 | * | 11/2003 | Wingard ................. H04L 29/06 709/217 |
| 2006/0190647 | A1 | * | 8/2006 | Asano ................. G06F 13/4221 710/110 |

(Continued)

FOREIGN PATENT DOCUMENTS

| | | |
|---|---|---|
| JP | 62-026563 A | 2/1987 |
| JP | 2002-109490 A | 4/2002 |
| JP | 2006-251923 A | 9/2006 |

*Primary Examiner* — Zachary K Huson
(74) *Attorney, Agent, or Firm* — Michael Best & Friedrich LLP

(57) ABSTRACT

An access control method of the disclosure includes: allowing one master device of a plurality of master devices to generate a request for access to a device to be accessed; allowing a slave device to identify, on a basis of the request for the access, the one master device that has generated the request for the access; and allowing the slave device to make a response to the one master device, at response timing that corresponds to the one master device identified.

20 Claims, 19 Drawing Sheets

(56) References Cited

U.S. PATENT DOCUMENTS

| | | | | |
|---|---|---|---|---|
| 2006/0236001 A1* | 10/2006 | Tanabe | ................... | G06F 13/28 |
| | | | | 710/22 |
| 2006/0294294 A1* | 12/2006 | Walker | ............... | G06F 13/1668 |
| | | | | 711/105 |
| 2012/0131246 A1* | 5/2012 | Jeong | ................. | G06F 13/4217 |
| | | | | 710/110 |
| 2012/0210029 A1* | 8/2012 | Yun | ........................ | G06F 13/36 |
| | | | | 710/110 |
| 2013/0124764 A1* | 5/2013 | Fenzl | .................... | G06F 13/24 |
| | | | | 710/110 |

* cited by examiner

[ FIG.1 ]
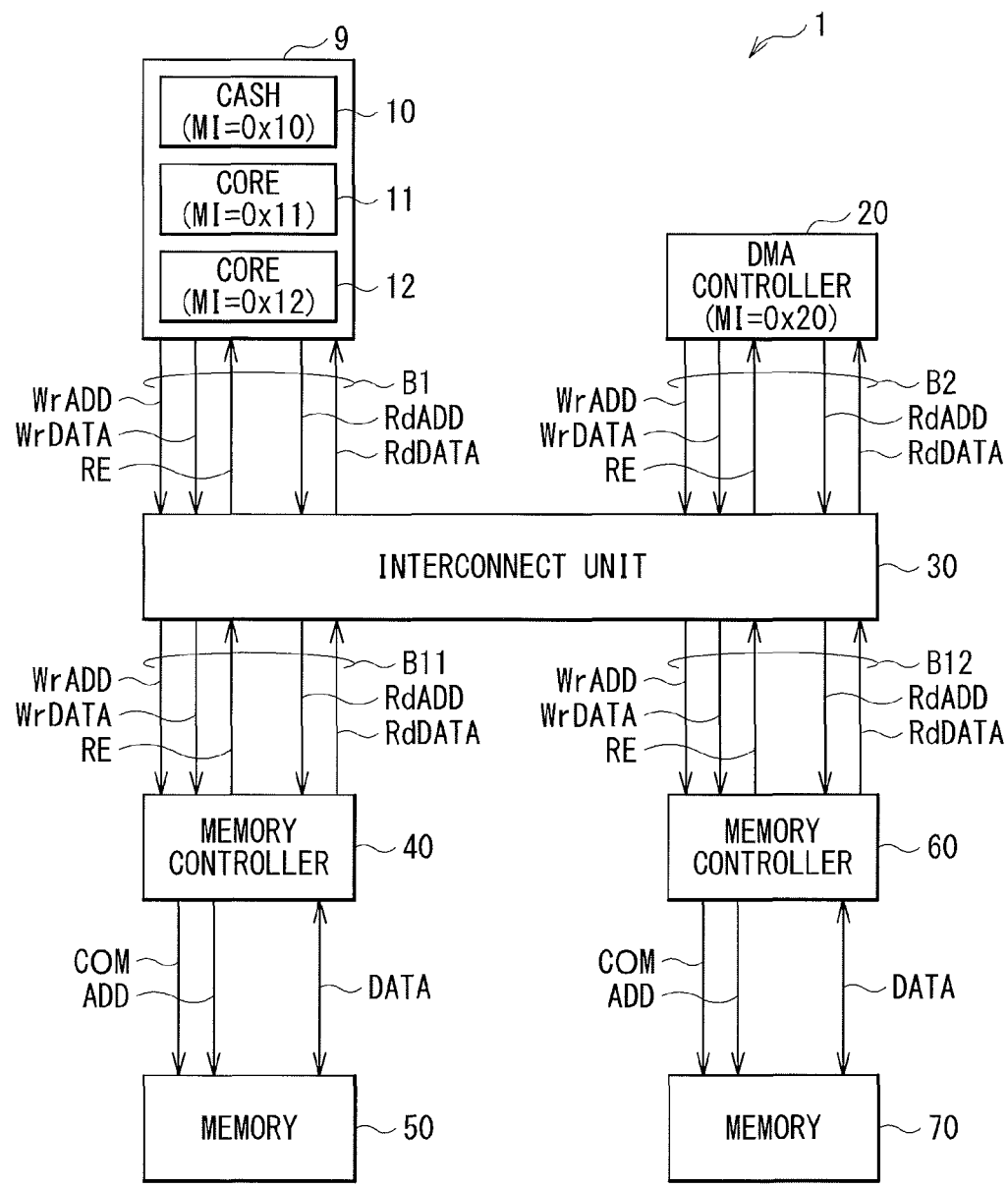

[ FIG.2 ]
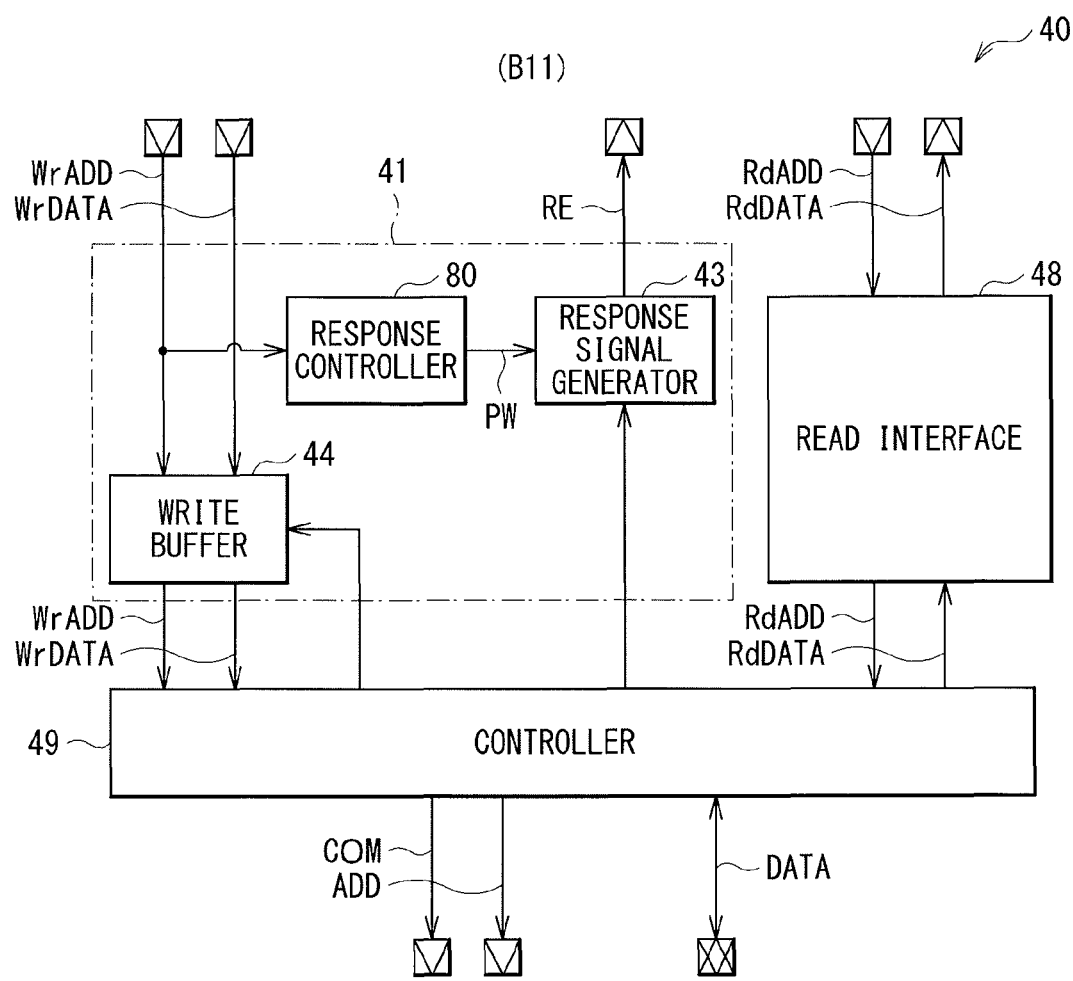

[ FIG. 3 ]
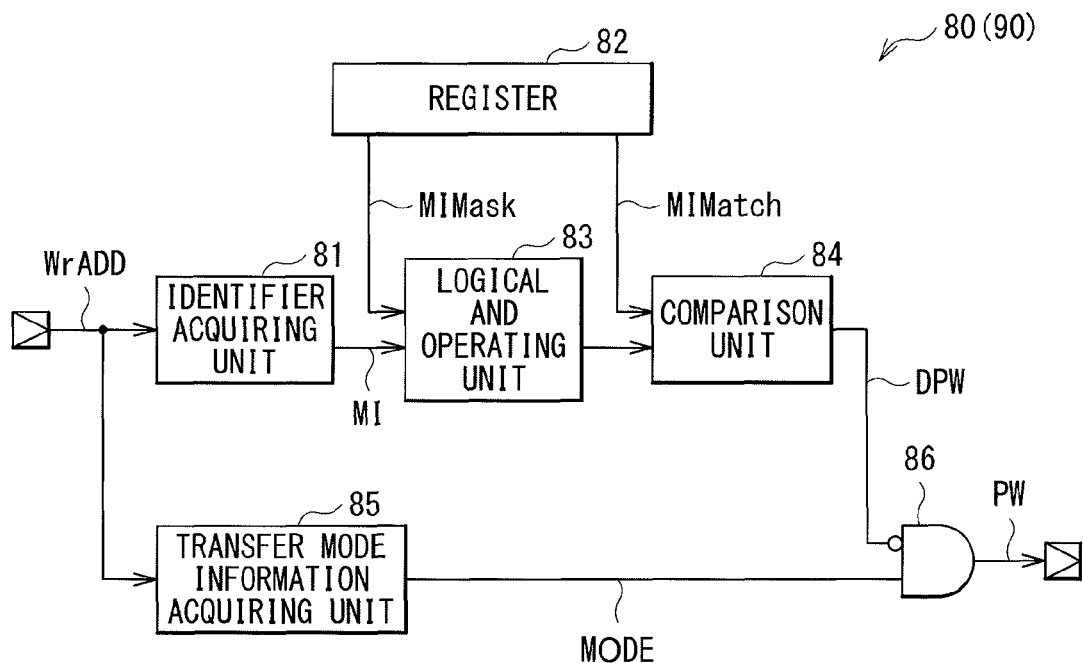
[ FIG. 4 ]
| | | IDENTI-FIER MI | PARAMETER DPW (MEMORY CONTROLLER 40) | PARAMETER DPW (MEMORY CONTROLLER 60) |
|---|---|---|---|---|
| INFORMATION PROCESSING APPARATUS 9 | CASH 10 | 0x10 | 1 | 0 |
| | CORE 11 | 0x11 | 1 | 0 |
| | CORE 12 | 0x12 | 1 | 0 |
| DMA CONTROLLER 20 | | 0x20 | 0 | 0 |

[ FIG. 5 ]
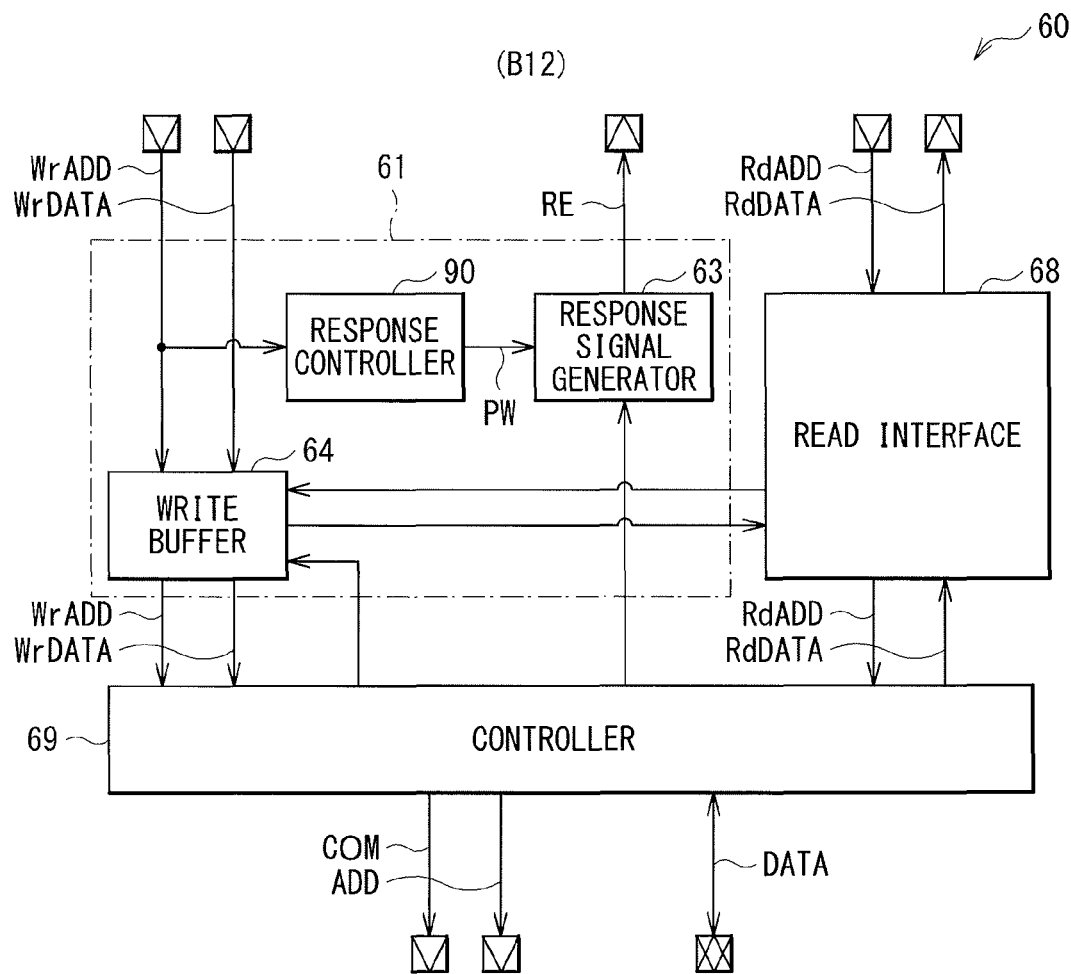

[ FIG.6 ]
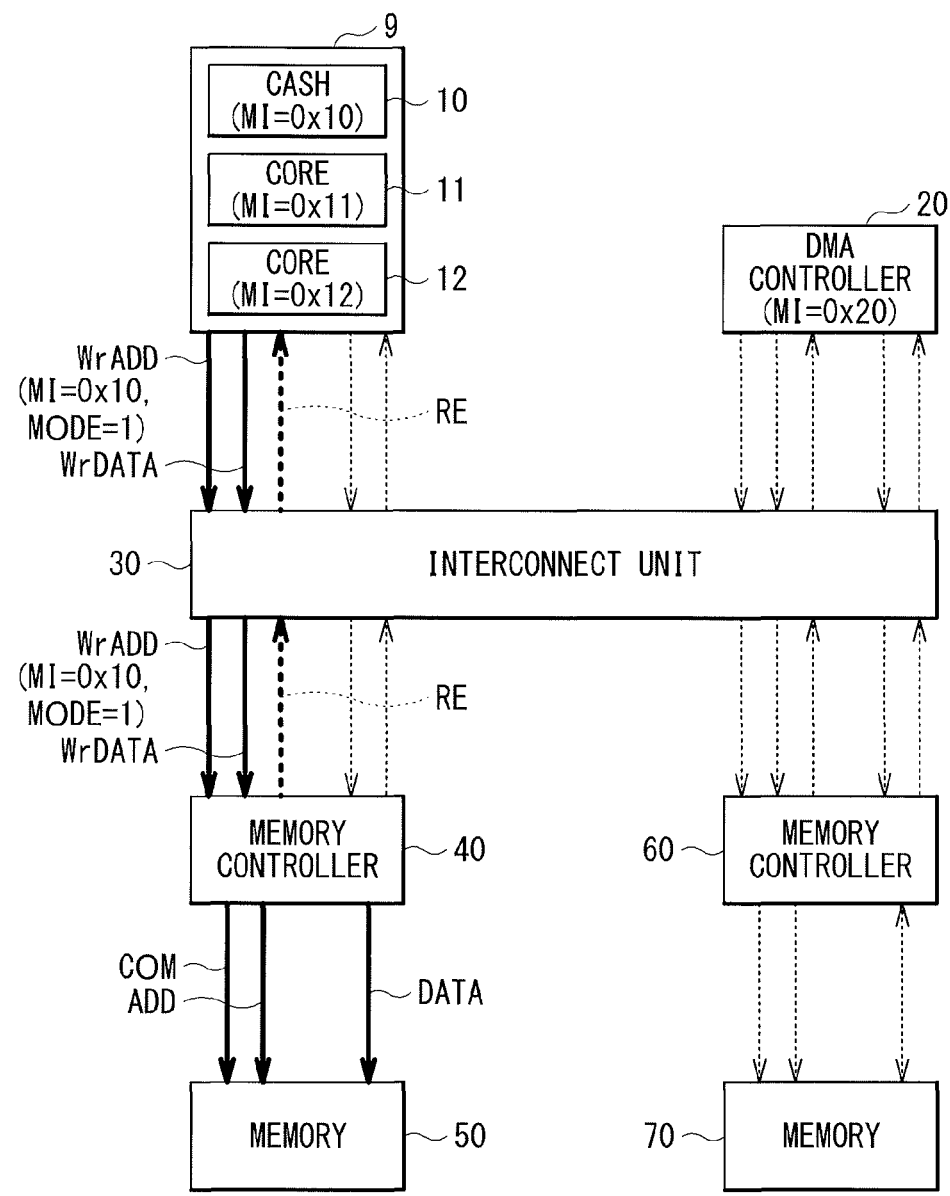

[ FIG. 7 ]
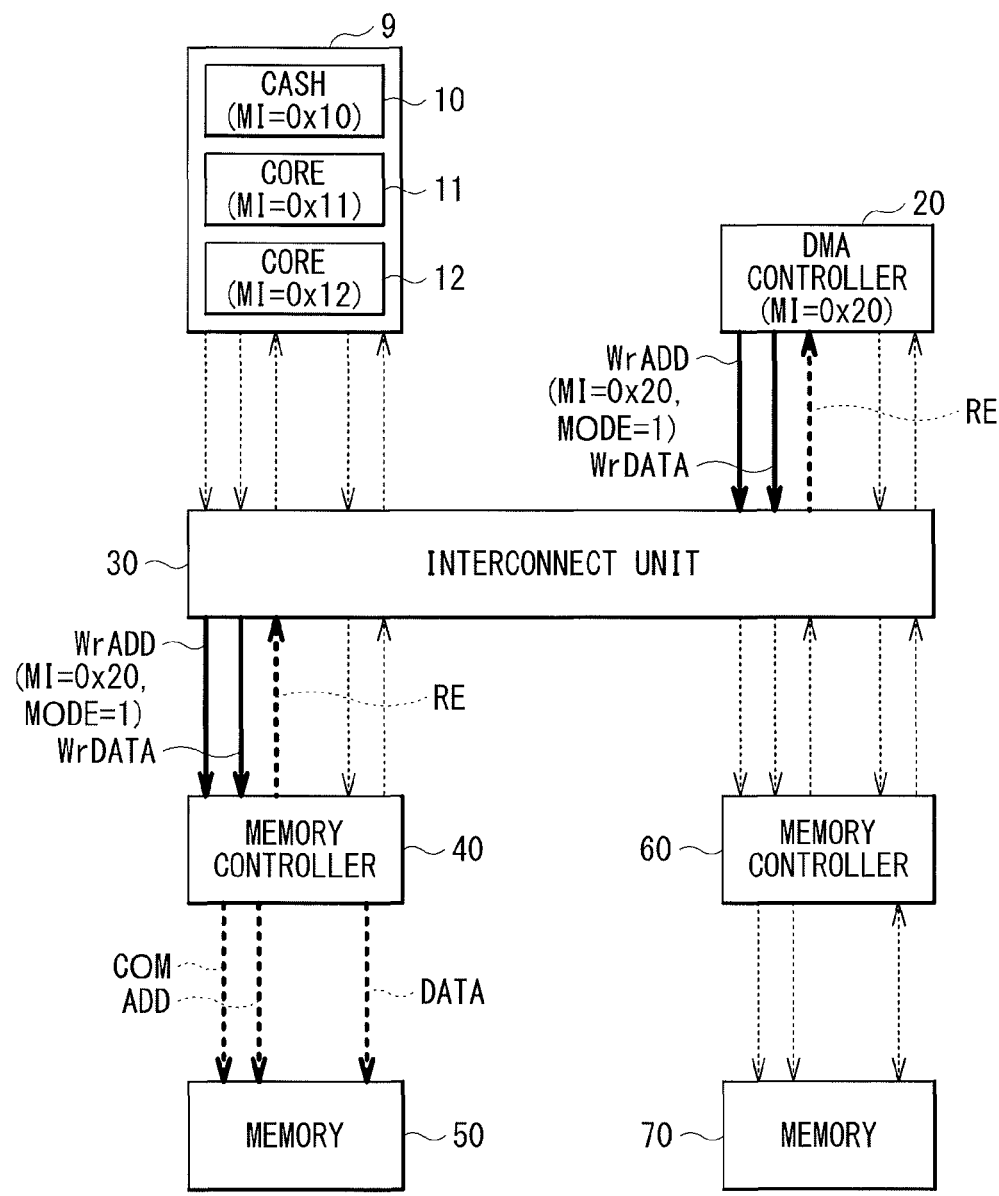

[FIG. 8]
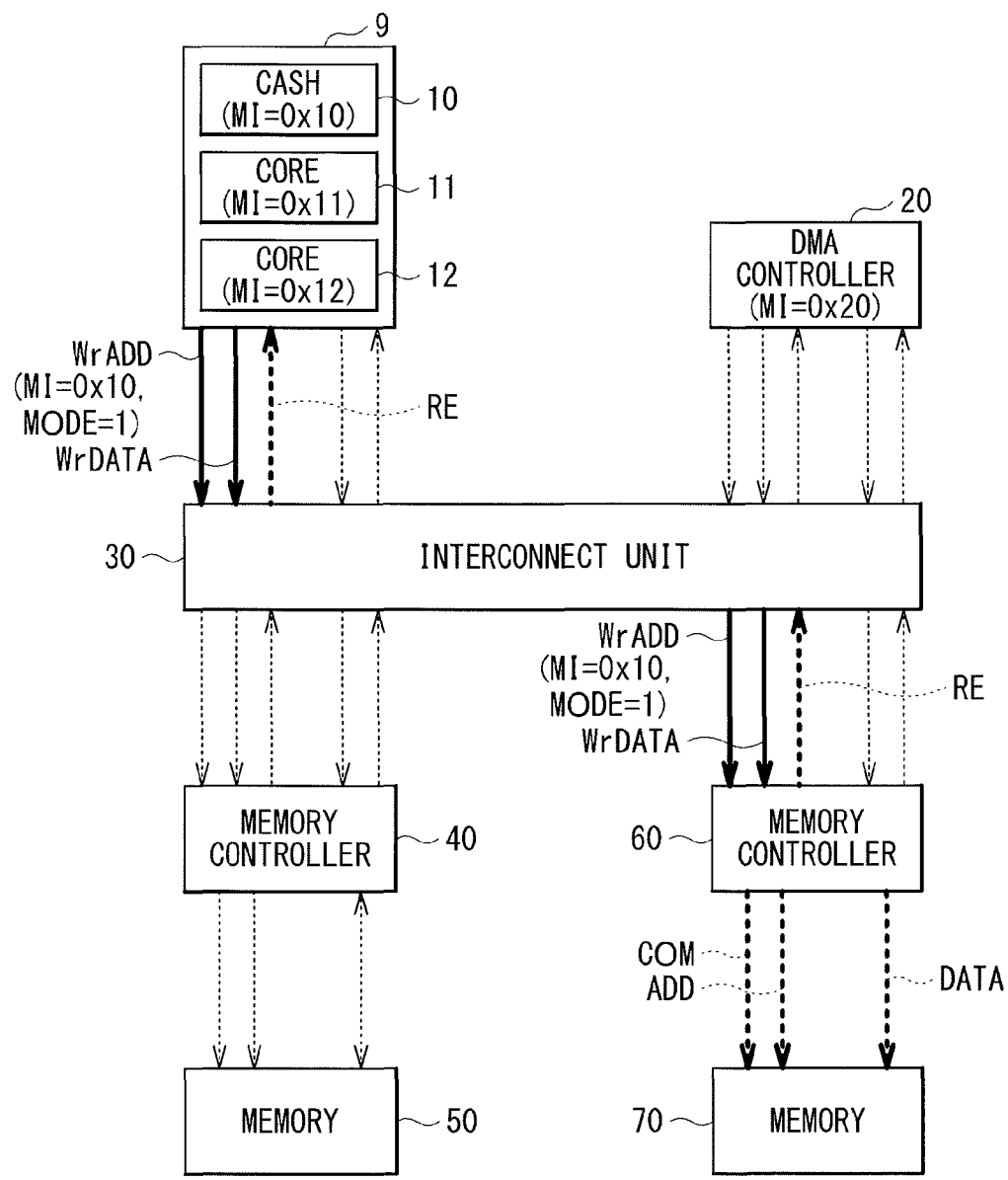

[FIG.9]
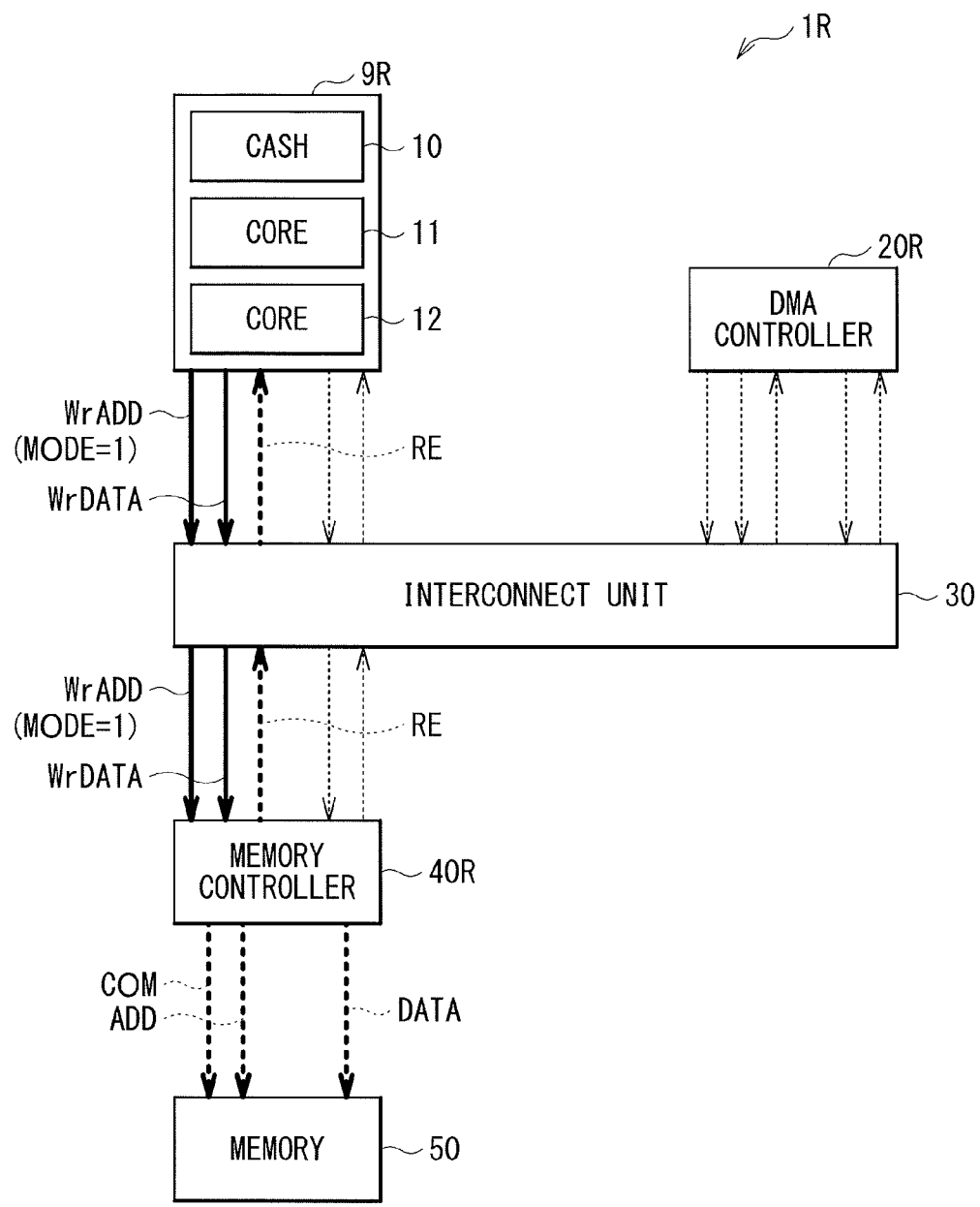

[ FIG. 10 ]
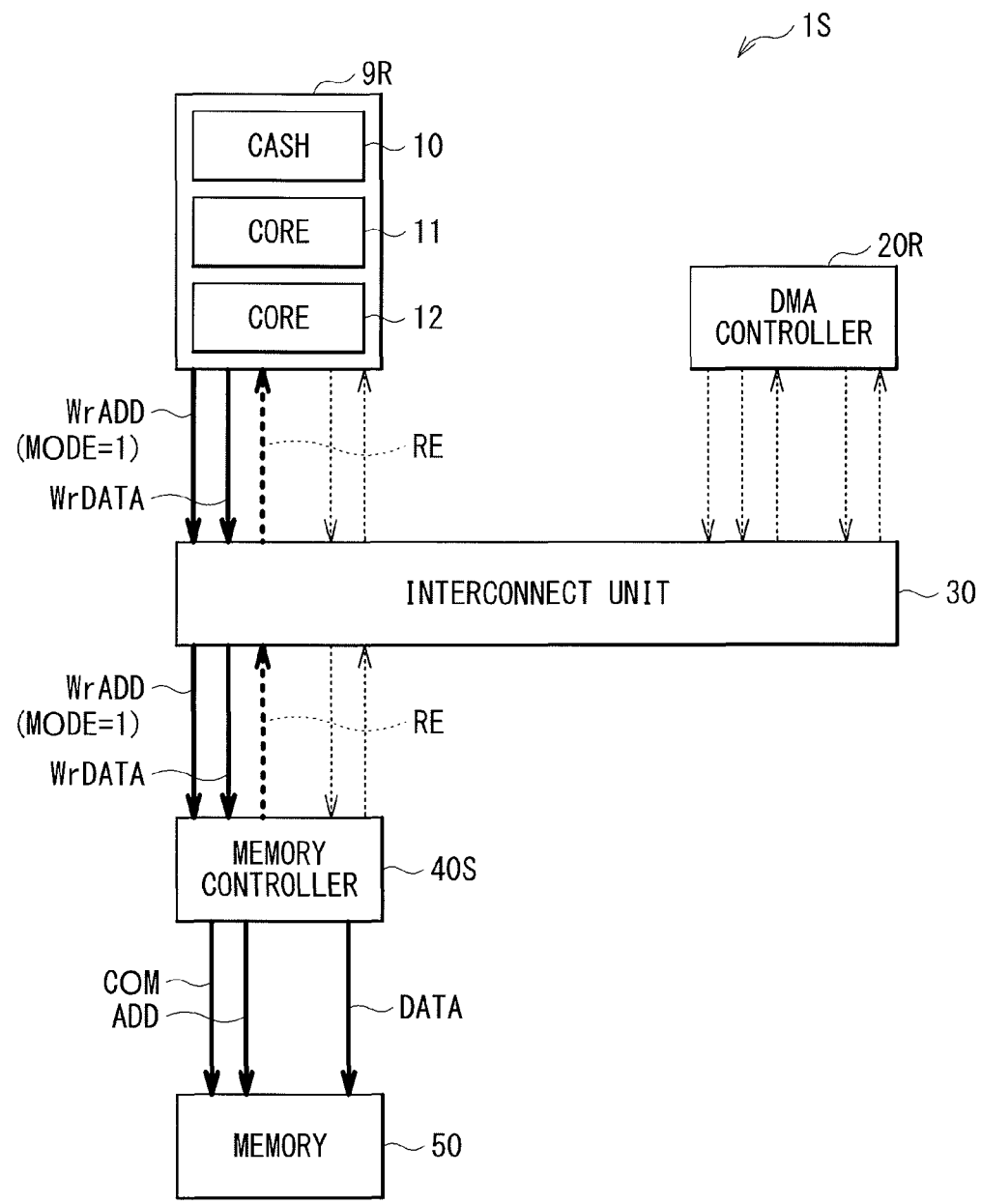

[ FIG. 11 ]
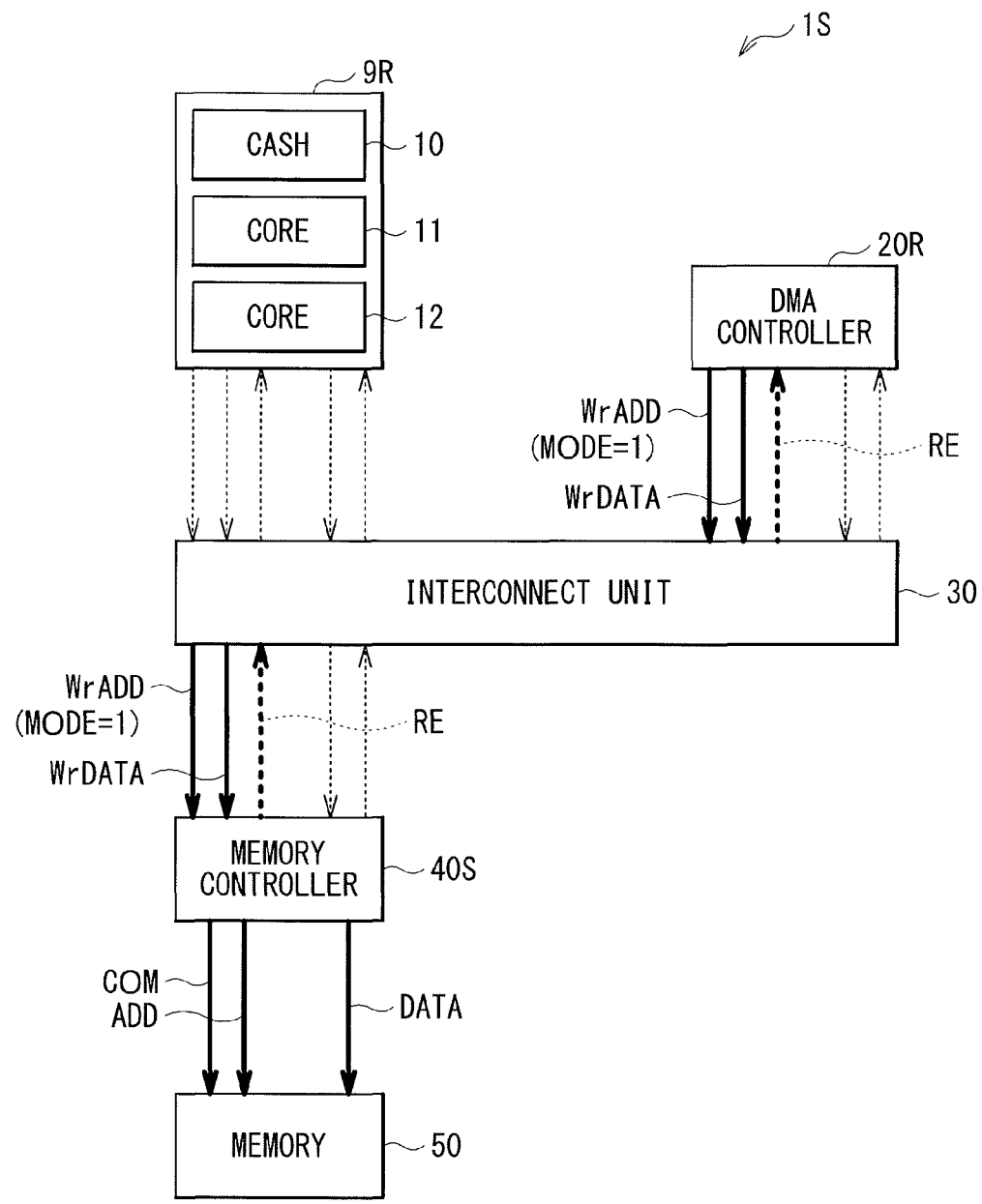

[ FIG. 12 ]
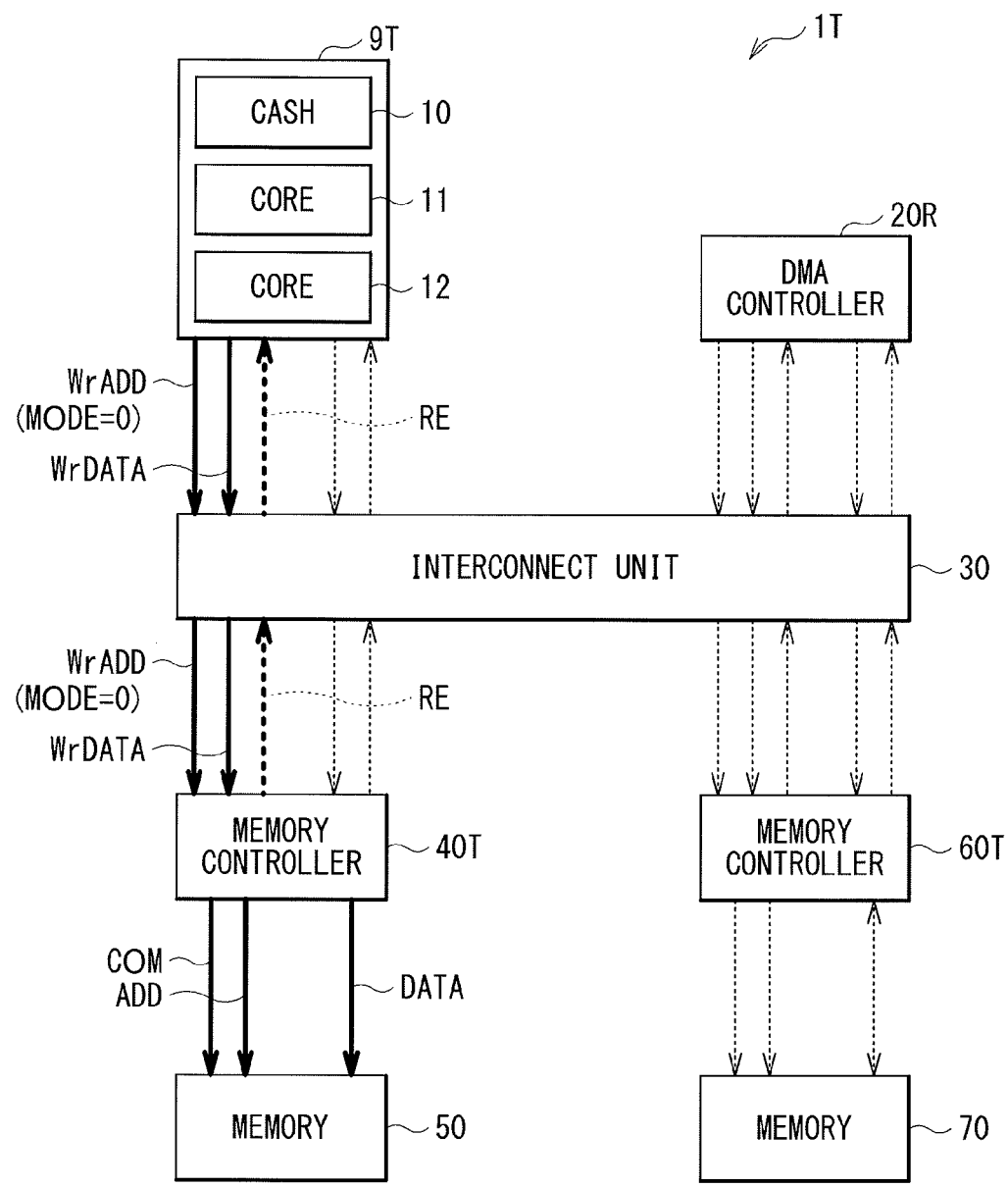

[ FIG. 13 ]
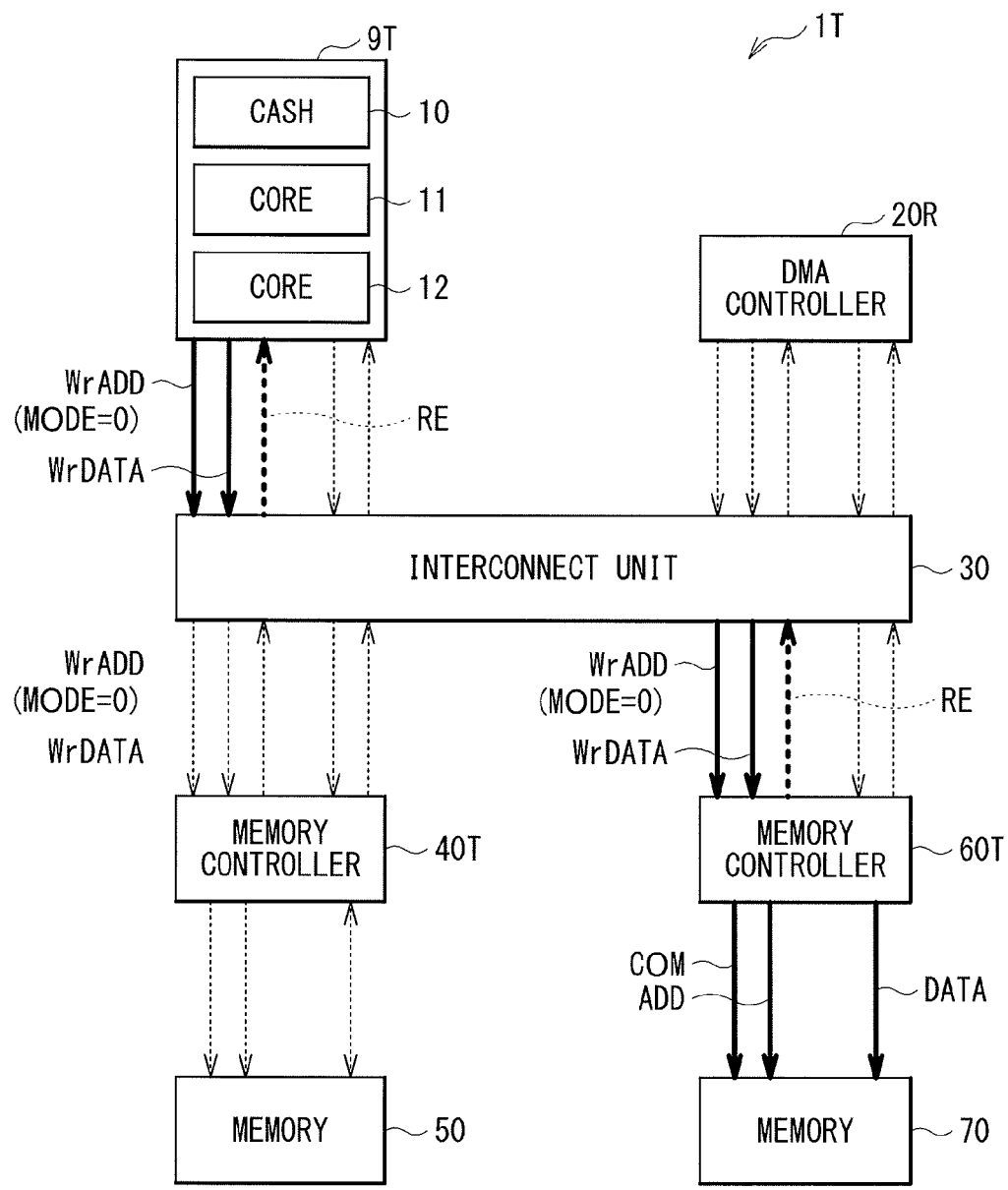

[ FIG. 14 ]
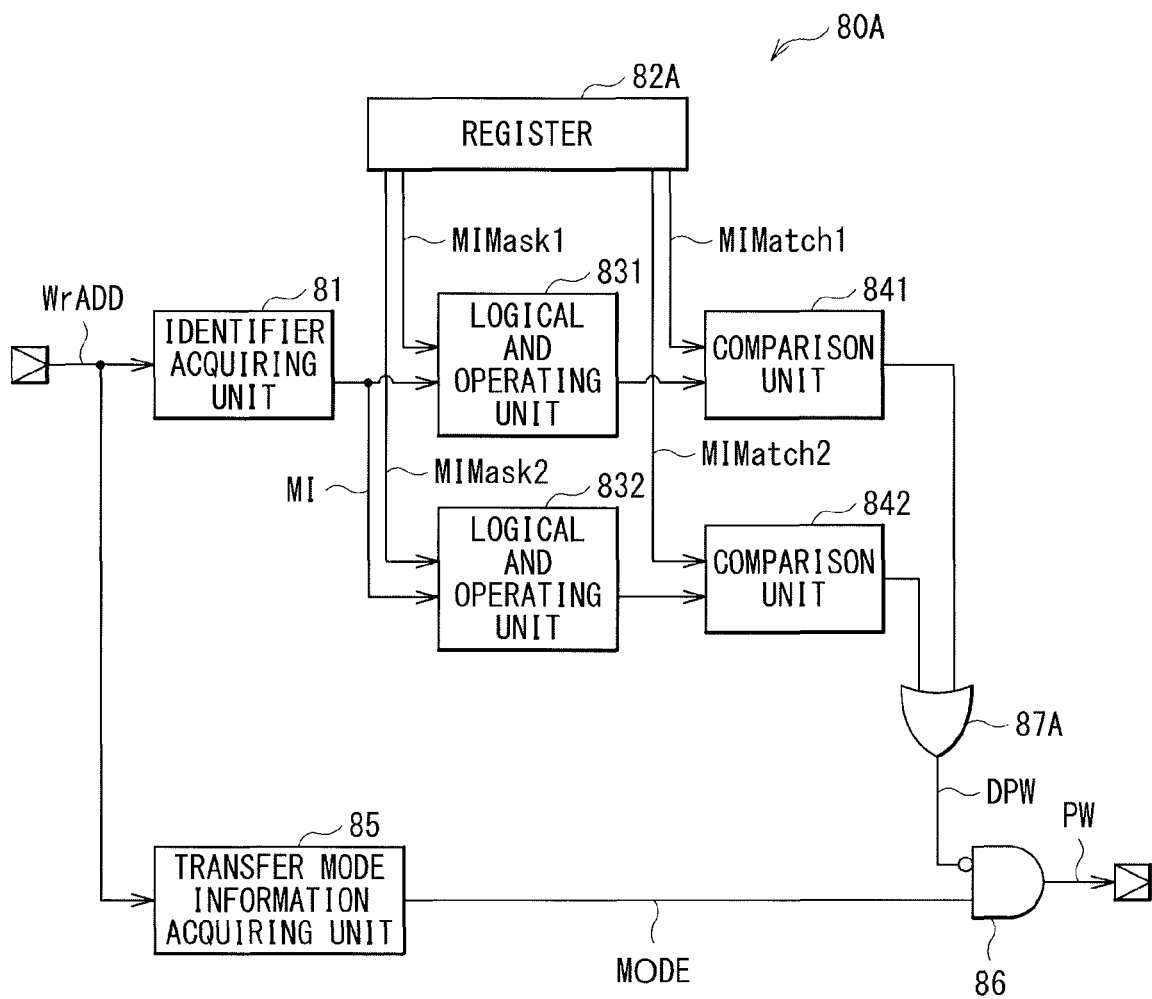

[FIG. 15]
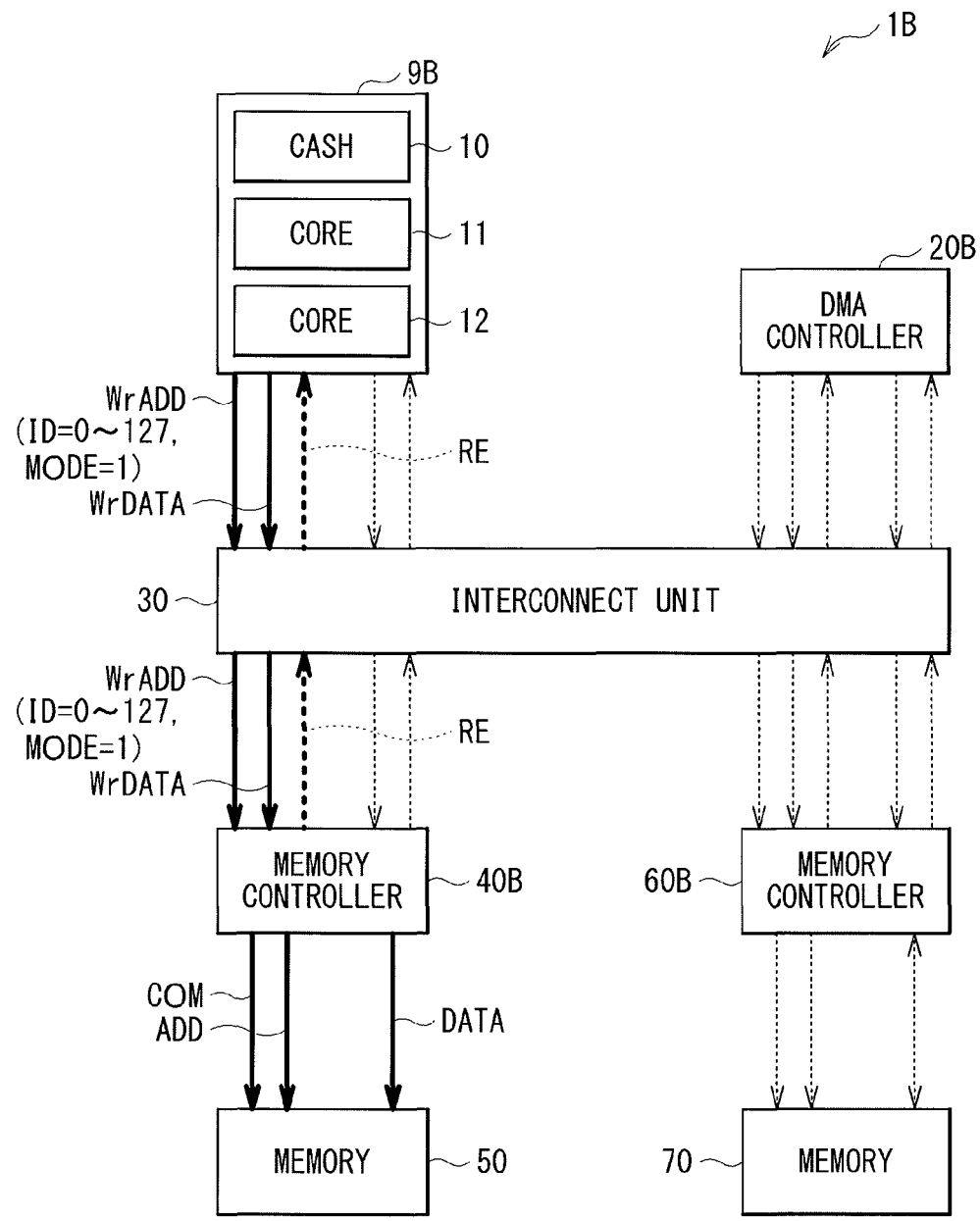

[ FIG. 16 ]
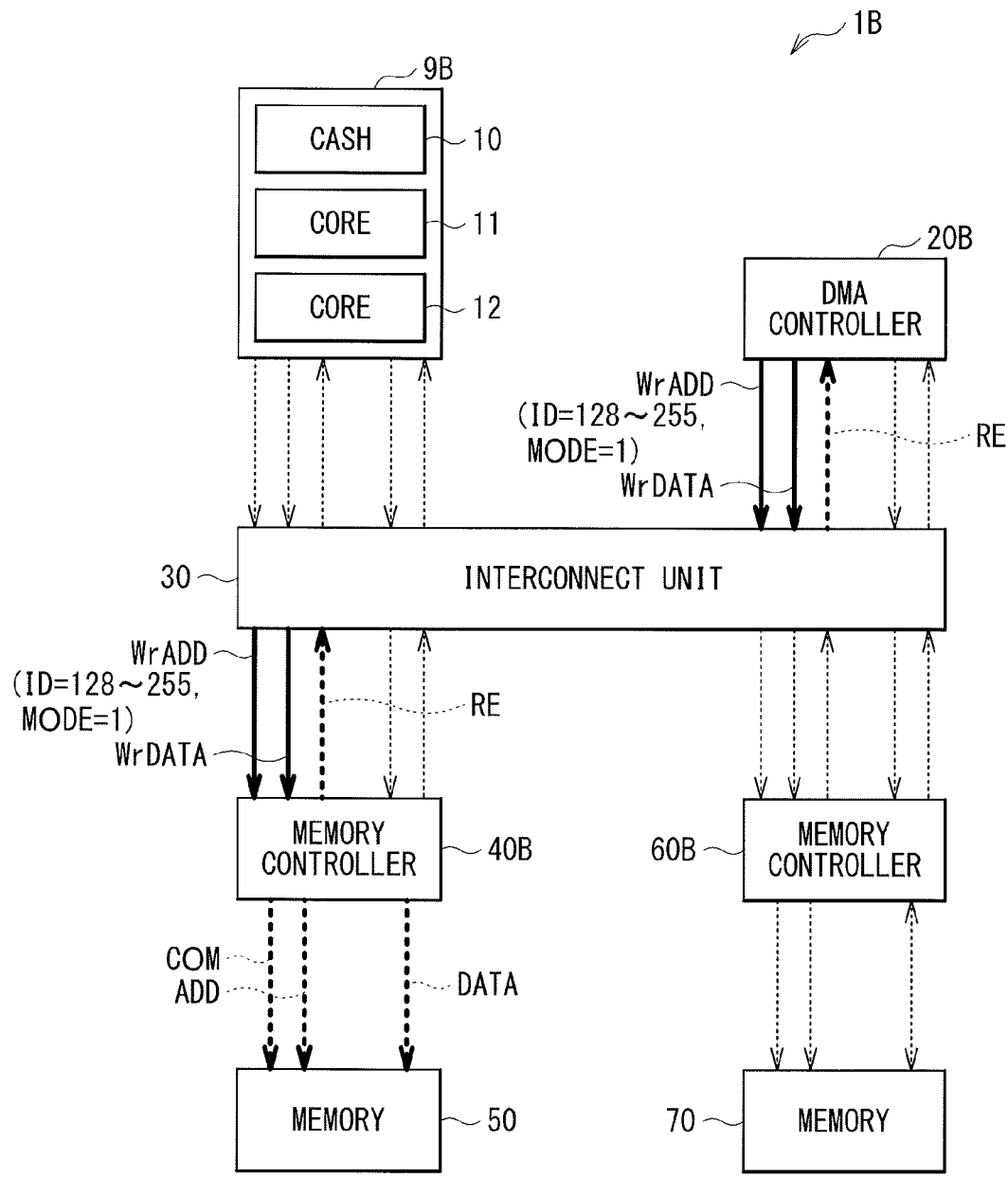

[ FIG. 17 ]
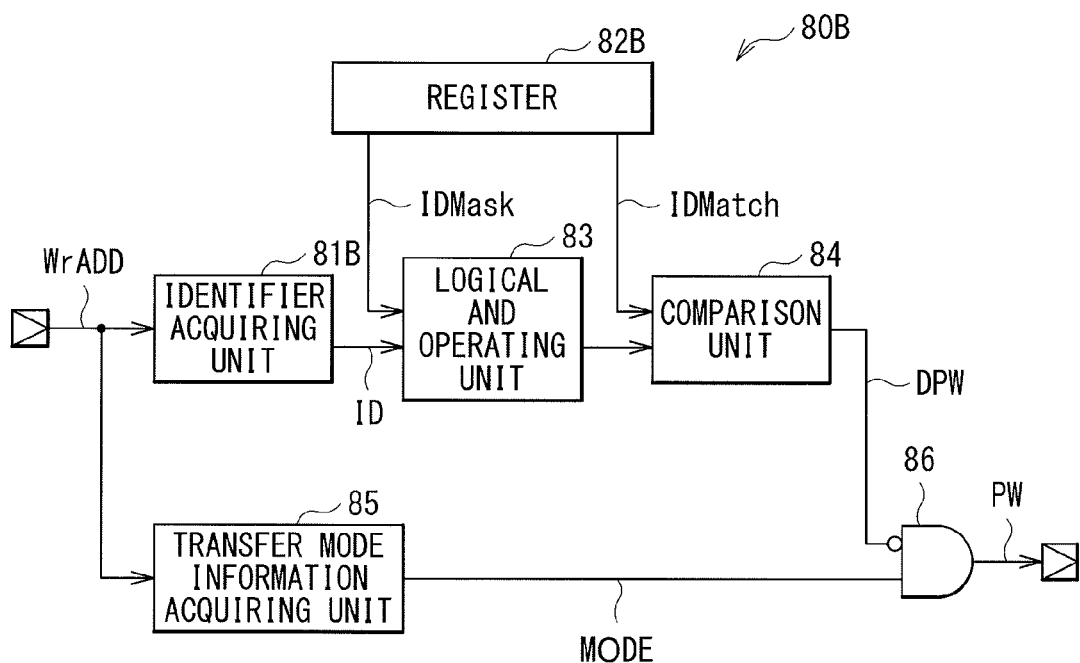

[ FIG. 18 ]
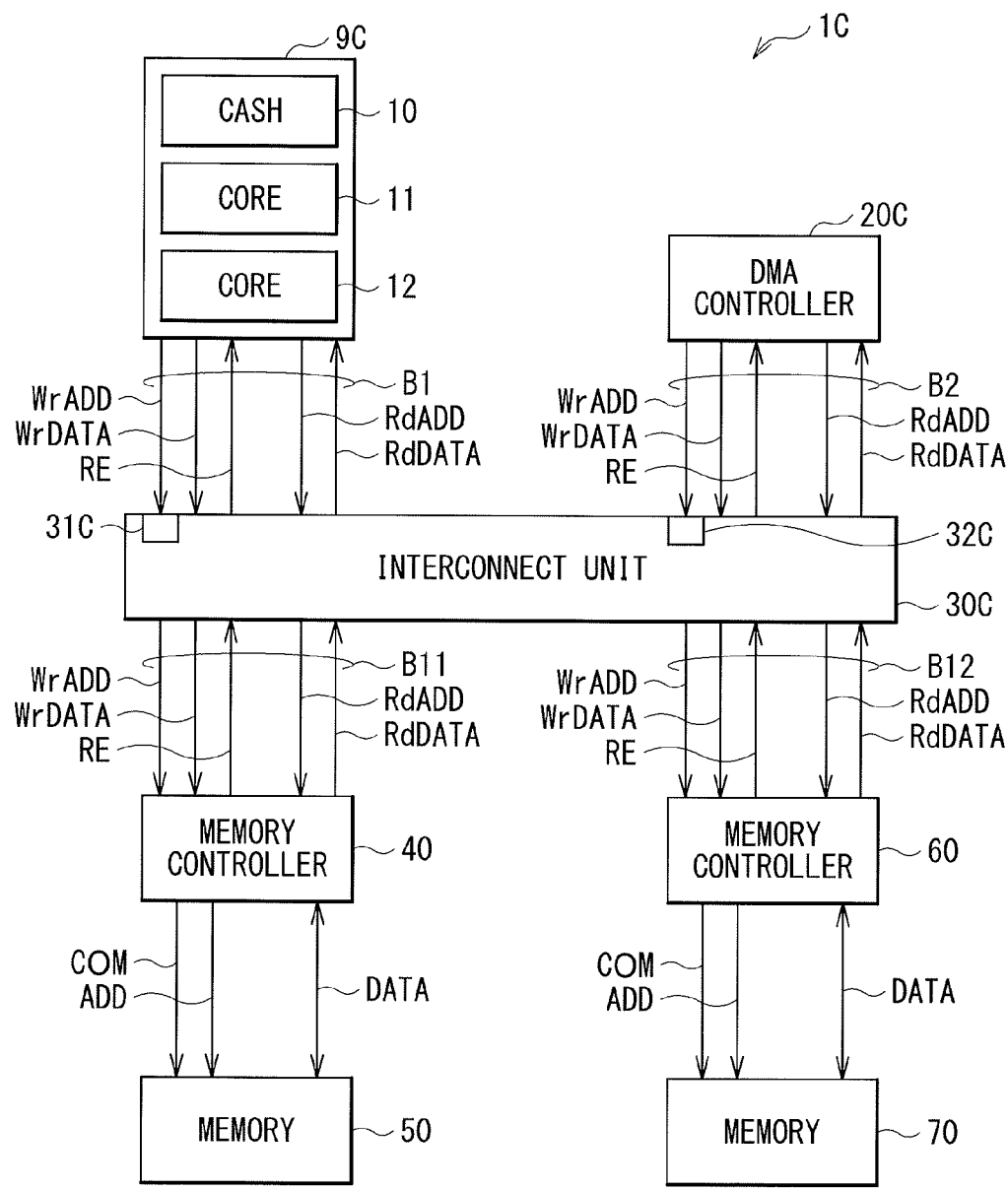

[ FIG. 19 ]
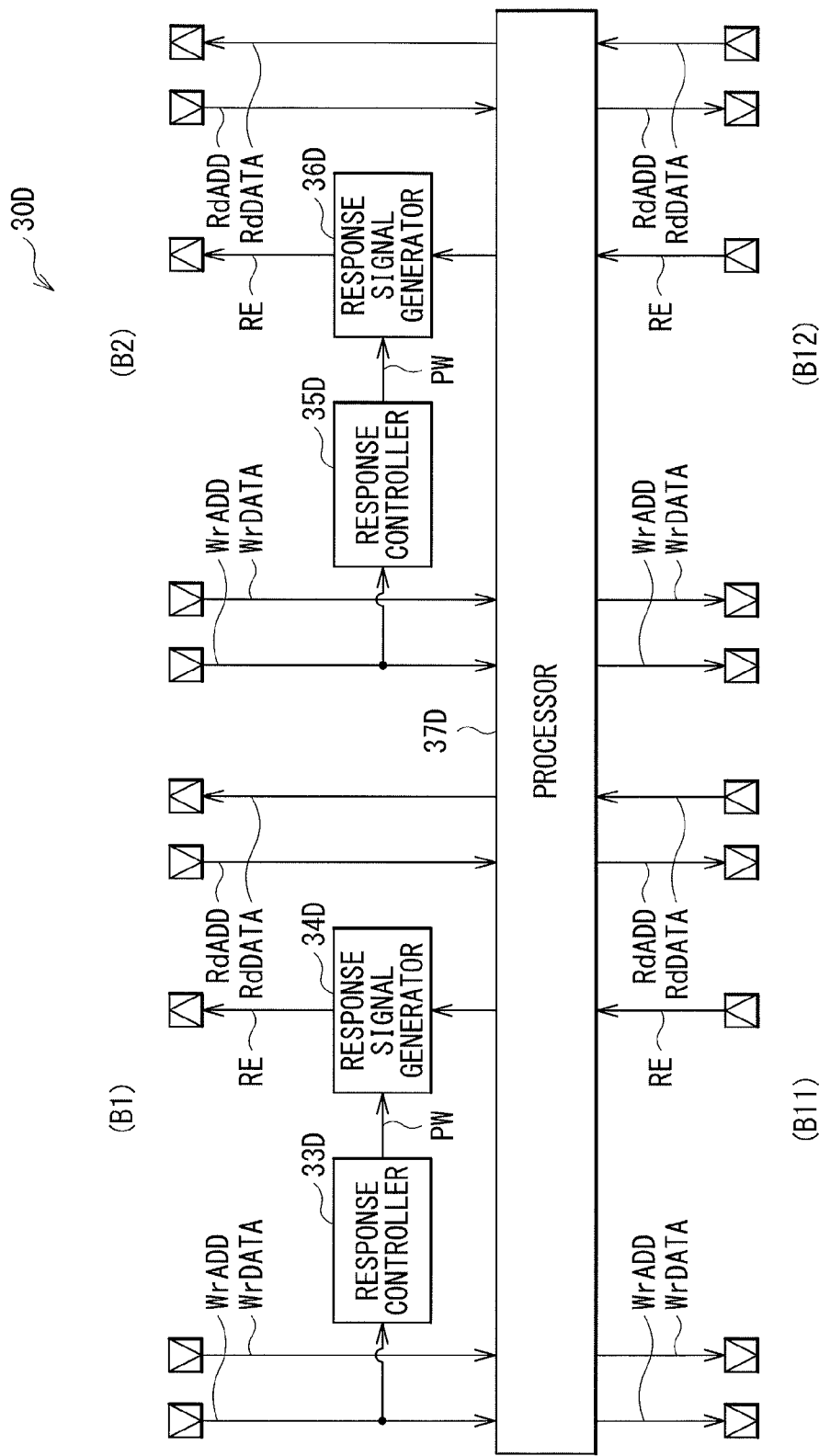

[FIG. 20]
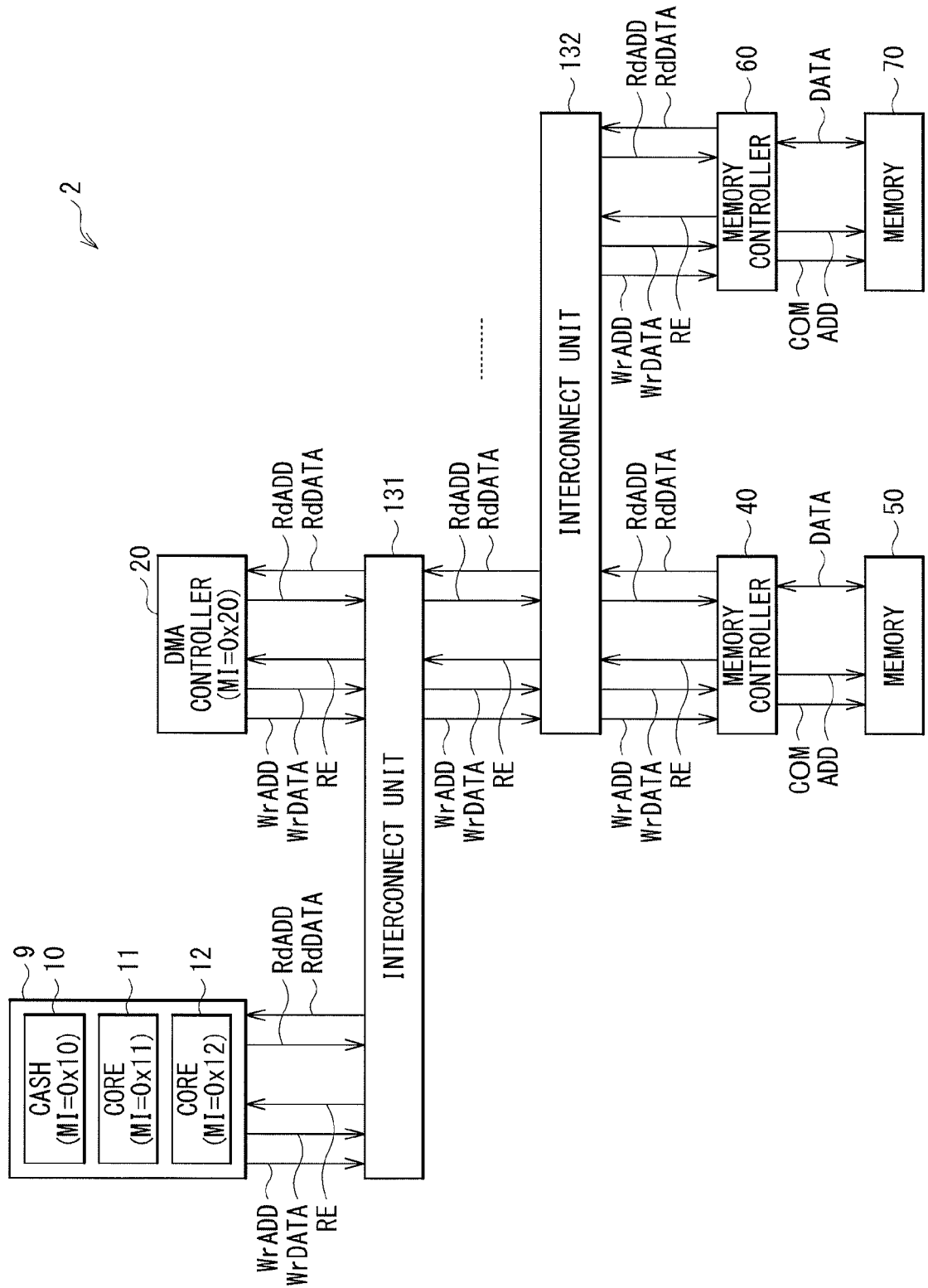

ACCESS CONTROL METHOD, BUS SYSTEM, AND SEMICONDUCTOR DEVICE

TECHNICAL FIELD

The disclosure relates to an access control method, a bus system that performs an access control with use of the access control method, and a semiconductor device including the bus system.

BACKGROUND ART

A processor may be often coupled to a memory through, for example, a bus and a memory controller. Moreover, the processor may write data to the memory, or read data from the memory, in performing operation processing. Examples of a control method in a case in which the processor writes the data to the memory may include posted transfer (also referred to as bufferable) and non-posted transfer (for example, PTL 1).

In the posted transfer, for example, when the processor (a master) makes a write request to a memory controller (a slave), the memory controller makes a response to the processor, prior to an end of data writing to the memory. In the posted transfer, the response may be made at earlier timing, which brings enhancement in transfer performance. This leads to expectation of enhancement in a processing speed in a whole system. However, in a case in which the processor makes such a write request to a certain address, and thereafter, makes a read request, latest data has not been written to the memory yet. Accordingly, there is possibility that old data before re-writing may be read. Thus, in the posted transfer, there is possibility of a disadvantage related to so-called coherency (data consistency).

In the non-posted transfer, for example, when the processor (the master) makes the write request to the memory controller (the slave), the memory controller makes the response after the end of the data writing to the memory. In this case, the response may be made at later timing than that of the posted transfer. This results in lowered transfer performance, causing possibility of a lower processing speed in the whole system, but allows for suppression of the coherency-related disadvantage.

CITATION LIST

Patent Literature

[PTL 1] Specification of U.S. Pat. No. 7,194,566

SUMMARY OF THE INVENTION

As described, in the memory access, it is desired to enhance the transfer performance while suppressing the coherency-related disadvantage, with expectation of further enhancement in the transfer performance.

It is therefore desirable to provide an access control method, a bus system, and a semiconductor device that make it possible to enhance transfer performance while suppressing a coherency-related disadvantage.

An access control method according to an embodiment of the disclosure includes: allowing one master device of a plurality of master devices to generate a request for access to a device to be accessed; allowing a slave device to identify, on a basis of the request for the access, the one master device that has generated the request for the access; and allowing the slave device to make a response to the one master device, at response timing that corresponds to the one master device identified.

A bus system according to an embodiment of the disclosure includes a plurality of master devices and a slave device. The plurality of master devices are able to generate a request for access to a device to be accessed. The slave device makes, on a basis of the request for the access, a response to one master device of the plurality of master devices that has generated the request for the access, at response timing that corresponds to the one master device.

A semiconductor device according to an embodiment of the disclosure includes a plurality of master devices and a slave device. The plurality of master devices are able to generate a request for access to a device to be accessed. The slave device makes, on a basis of the request for the access, a response to one master device of the plurality of master devices that has generated the request for the access, at response timing that corresponds to the one master device.

In the access control method, the bus system, and the semiconductor device in the embodiments of the disclosure, the request for the access is generated by the one master device of the plurality of master devices. On the basis of the request for the access, processing is performed on the device to be accessed. At this occasion, the response from the slave device to the one master device is made at the response timing that corresponds to the one master device.

According to the access control method, the bus system, and the semiconductor device in the embodiments of the disclosure, the response to the one master device is made at the response timing that corresponds to the one master device. Hence, it is possible to enhance the transfer performance while suppressing the coherency-related disadvantage. It is to be noted that some effects described here are not necessarily limitative, and any of other effects described herein may be achieved.

BRIEF DESCRIPTION OF DRAWING

FIG. 1 is a block diagram of one example of a configuration of a bus system according to an embodiment of the disclosure.

FIG. 2 is a block diagram of one example of a configuration of a memory controller illustrated in FIG. 1.

FIG. 3 is a block diagram of one example of a configuration of a response controller illustrated in FIG. 2.

FIG. 4 is a table that summarizes one example of operation of the response controller illustrated in FIG. 3.

FIG. 5 is a block diagram of one example of a configuration of another memory controller illustrated in FIG. 1.

FIG. 6 describes one example of operation of a bus system illustrated in FIG. 1.

FIG. 7 describes another example of the operation of the bus system illustrated in FIG. 1.

FIG. 8 describes another example of the operation of the bus system illustrated in FIG. 1.

FIG. 9 describes one example of operation of a bus system according to a comparative example 1.

FIG. 10 describes one example of operation of a bus system according to a comparative example 2.

FIG. 11 describes another example of the operation of the bus system according to the comparative example 2.

FIG. 12 describes one example of operation of a bus system according to a comparative example 3.

FIG. 13 describes another example of the operation of the bus system according to the comparative example 3.

FIG. 14 is a block diagram of one example of a configuration of a response controller according to a modification example.

FIG. 15 describes one example of operation of a bus system according to another modification example.

FIG. 16 describes another example of the operation of the bus system illustrated in FIG. 15.

FIG. 17 is a block diagram of one example of a configuration of a response controller related to the bus system illustrated in FIG. 15.

FIG. 18 is a block diagram of one example of a configuration of a bus system according to another modification example.

FIG. 19 is a block diagram of one example of an interconnect unit according to another modification example.

FIG. 20 is a block diagram of one example of a configuration of a bus system according to another modification example.

MODES FOR CARRYING OUT THE INVENTION

In the following, some embodiments of the disclosure are described in detail with reference to the drawings.
[Example of Configuration]
[Example of Overall Configuration]

FIG. 1 illustrates an example of a configuration of a bus system according to an embodiment. A bus system 1 may be, in this example, a so-called SoC (System on Chip) system that includes one chip. It is to be noted that since an access control method and a semiconductor device according to embodiments of the disclosure are embodied by this embodiment, description thereof is made together.

The bus system 1 may include an information processing unit 9, DMA (Direct Memory Access) controller 20, an interconnect unit 30, memory controllers 40 and 60, and memories 50 and 70. In this example, circuits except for the memories 50 and 70 may be integrated in one chip. It is to be noted that this is non-limiting. In one alternative, all circuits may be integrated in one chip.

The information processing unit 9 may perform operation processing. In this example, the information processing unit 9 may include a cash 10 and two cores 11 and 12. The cash 10 may be a level 2 (L2) cash memory. The cores 11 and 12 may each be a so-called processor core. The information processing unit 9 may be coupled to the interconnect unit 30 through a bus B1. As the information processing unit 9, a combination of a processor available from ARM Ltd. (e.g., Cortex-A9 MPCore) and an IP (Intellectual Property) such as a level 2 cash controller available from ARM Ltd. (e.g., L2C-310) may be used. As a bus interface with the interconnect unit 30, for example, an AXI (Advanced eXtensive Interface) may be used.

An identifier MI may be assigned to each of the cash 10 and the cores 11 and 12. The identifier MI may be different for each of the cash 10 and the cores 11 and 12. In this example, the identifier MI may be an 8-bit parameter. Specifically, in this example, the identifier MI of the cash 10 may be "0x10" in hexadecimal number notation ("00010000" in binary number notation). The identifier MI of the core 11 may be "0x11" ("00010001" in the binary number notation). The identifier MI of the core 12 may be "0x12" ("00010010" in the binary number notation). Upper-order four bits (bits b4 to b7) of the identifiers MI of the cash 10 and the cores 11 and 12 may be same as one another. In other words, in this example, the upper-order four bits of the identifiers MI may be the same, in consideration that data transfer performance through the bus interface is same, in blocks (i.e., the cash 10 and the cores 11 and 12) of the information processing unit 9. Moreover, lower-order four bits (bits b0 to b3) of the identifiers MI of the cash 10 and the cores 11 and 12 may be different from one another.

In making a write request to the memory 50 or the memory 70, the information processing unit 9 may supply the interconnect unit 30 with a write address WrADD and write data WrDATA, and receive a response signal RE from the interconnect unit 30. The write address WrADD may include, for example, the identifier MI and transfer mode information MODE, in addition to address information. The transfer mode information MODE may indicate whether a device that makes the write request (in this example, the information processing unit 9) requests for posted transfer or non-posted transfer. In one specific example, the information processing unit 9 may set the transfer mode information MODE as "1", in making the write request by the posted transfer, and set the transfer mode information MODE as "0", in making the write request by the non-posted transfer. Moreover, the write address WrADD may further include, for example, information on a bit width or a burst length of the data to be written, and security information.

It is to be noted in a case with use of the AXI as the bus interface, the transfer mode information MODE may correspond to a parameter AWCACHE [0] of the AXI. Moreover, the identifier MI may be assigned to a sideband signal of the AXI. At this occasion, an existing sideband signal such as a parameter AWUSER may be used, or alternatively, a sideband signal may be newly defined.

Furthermore, in making a read request to the memory 50 or the memory 70, the information processing unit 9 may supply the interconnect unit 30 with a read address RdADD, and receive read data RdDATA from the interconnect unit 30.

The DMA controller 20 may be a controller that controls DMA transfer to the memories 50 and 70. The identifier MI may be assigned to the DMA controller 20, as with the blocks of the information processing unit 9. Specifically, in this example, the identifier MI of the DMA controller 20 may be "0x20" ("00100000" in the binary number notation). The DMA controller 20 may be coupled to the interconnect unit 30 through a bus B2, as with the information processing unit 9. Moreover, in making the write request to the memory 50 or the memory 70, the DMA controller 20 may supply the interconnect unit 30 with the write address WrADD and the write data WrDATA, and receive the response RE from the interconnect unit 30, as with the information processing unit 9. Furthermore, in making the read request to the memory 50 or the memory 70, the DMA controller 20 may supply the interconnect unit 30 with the read address RdADD, and receive the read data RdDATA from the interconnect unit 30, as with the information processing unit 9.

In the figure, the information processing unit 9 and the DMA controller 20 may be coupled to the interconnect unit 30, but this is non-limiting. In one alternative, another device may be coupled. In this case, in one desirable example, the identifier MI may be assigned to the device. The identifier MI of the device may be different from the identifiers MI of the information processing unit 9 (the cash 10 and the two cores 11 and 12) and the DMA controller 20. For example, another DMA controller 120 may be coupled that has substantially same transfer performance as that of the DMA controller 20. In this case, for example, the identifier MI of the DMA controller 120 may be "0x21" ("00100001" in the binary number notation). In other words, in this example, the upper-order four bits of the identifiers MI may be the same, in consideration that the data transfer performance of the DMA controllers 20 and 120 is substantially the same.

The interconnect unit 30 may arbitrate the access to the memories 50 and 70 by the information processing unit 9 and the DMA controller 20. The interconnect unit 30 may be coupled to the information processing unit 9 through the bus B1. The interconnect unit 30 may be coupled to the DMA controller 20 through the bus B2. The interconnect unit 30 may be coupled to the memory controller 40 through a bus B11. The interconnect unit 30 may be coupled to the memory controller 60 through a bus B12.

When the information processing unit 9 or the DMA controller 20 makes the write request to the memory 50, the interconnect unit 30 may transfer, to the memory controller 40, the write address WrADD and the write data WrDATA supplied from the device that has made the write request. The interconnect unit 30 may transfer, to the device that has made the write request, the response signal RE supplied from the memory controller 40. Moreover, when the information processing unit 9 or the DMA controller 20 makes the read request to the memory 50, the interconnect unit 30 may transfer, to the memory controller 40, the read address RdADD supplied from the device that has made the read request. The interconnect unit 30 may transfer, to the device that has made the read request, the read data RdDATA supplied from the memory controller 40.

Similarly, when the information processing unit 9 or the DMA controller 20 makes the write request to the memory 70, the interconnect unit 30 may transfer, to the memory controller 60, the write address WrADD and the write data WrDATA supplied from the device that has made the write request. The interconnect unit 30 may transfer, to the device that has made the write request, the response signal RE supplied from the memory controller 60. Moreover, when the information processing unit 9 or the DMA controller 20 makes the read request to the memory 70, the interconnect unit 30 may transfer, to the memory controller 60, the read address RdADD supplied from the device that has made the read request. The interconnect unit 30 may transfer, to the device that has made the read request, the read data RdDATA supplied from the memory controller 60.

The memory controller 40 may control operation of the memory 50. The memory controller 40 may be coupled to the interconnect unit 30 through the bus B11. The memory controller 40 may generate a control command COM, on the basis of the write address WrADD and the read address RdADD supplied from the interconnect unit 30. The memory controller 40 may supply the control command COM to the memory 50. Moreover, the memory controller 40 may generate an address ADD, on the basis of the write address WrADD and the read address RdADD supplied from the interconnect unit 30. The memory controller 40 may supply the address ADD to the memory 50. Furthermore, the memory controller 40 may supply the memory 50 with the write data WrDATA supplied from the interconnect unit 30, as data DATA. The memory controller 40 may supply the interconnect unit 30 with the data DATA supplied from the memory 50, as the read data RdDATA. In performing data writing to the memory 50, the memory controller 40 may allow a write buffer 44 incorporated (described later) to temporarily store the write address WrADD and the write data WrDATA. Thereafter, the memory controller 40 may perform the data writing to the memory 50, on the basis of information stored in the write buffer 44.

Further, the memory controller 40 may also have a function of generating the response signal RE. At this occasion, the memory controller 40 may decide timing of generation of the response signal RE, on the basis of the identifier MI and the transfer mode information MODE. In one specific example, as described later, when the information processing unit 9 or the DMA controller 20 makes the write request by the non-posted transfer (MODE=0) to the memory 50, the memory controller 40 may generate the response signal RE at timing of an end of the data writing to the memory 50. The memory controller 40 may supply the response signal RE to the device that has made the write request, through the interconnect unit 30. In other words, in this case, the non-posted transfer may be performed. Moreover, when the information processing unit 9 or the DMA controller 20 makes the write request by the posted transfer (MODE=1) to the memory 50, the memory controller 40 may select a transfer scheme, on the basis of the identifier MI. Specifically, when the information processing unit 9 (the cash 10 and the cores 11 and 12) makes the write request, the memory controller 40 may generate the response signal RE at the timing of the end of the data writing to the memory 50. The memory controller 40 may supply the response signal RE to the device that has made the write request, through the interconnect unit 30. In other words, in this case, the non-posted transfer may be performed. Moreover, when the DMA controller 20 makes the write request, the memory controller 40 may generate the response signal RE at timing at which the data writing has been performed to the write buffer 44 incorporated (described later). The memory controller 40 may supply the response signal RE to the device that has made the write request, through the interconnect unit 30. In other words, in this case, the posted transfer may be performed.

As described, in the memory controller 40, when the information processing unit 9 makes the write request, the response signal RE may be generated at the timing of the end of the data writing to the memory 50. This makes it possible to suppress a coherency-related disadvantage. Specifically, if the information processing unit 9 makes the write request to a certain address of the memory 50, and immediately thereafter, makes the read request, there is possibility that data before re-writing may be read. In contrast, in the memory controller 40, when the information processing unit 9 makes the write request, the response signal RE may be generated at the timing of the end of the data writing to the memory 50. This allows for reading of data after re-writing, even if the information processing unit 9 makes the read request immediately after the write request to the same address as that of the write request. Hence, it is possible to suppress the coherency-related disadvantage.

The memory controller 60 may control operation of the memory 70, as with the memory controller 40. The memory controller 60 may be coupled to the interconnect unit 30 through the bus B12. Moreover, in performing the data writing to the memory 70, as with the memory controller 40, the memory controller 60 may allow a write buffer 64 incorporated (described later) to temporarily store the write address WrADD and the write data WrDATA. Thereafter, the memory controller 60 may perform the data writing to the memory 70, on the basis of information stored in the write buffer 64. Unlike the memory controller 40, the memory controller 60 may have a snoop mechanism. In one specific example, upon receipt of the read request for data stored in the write buffer 64, the memory controller 60 may read the data from the write buffer 64. The memory controller 60 may output the data thus read, as the read data RdDATA. Thus, reading the data from the write buffer 64, instead of reading data from the memory 70, makes it possible to suppress the coherency-related disadvantage.

Further, the memory controller 60 may also have the function of generating the response signal RE, as with the memory controller 40. At this occasion, the memory controller 60 may decide the timing of the generation of the response signal RE, on the basis of the transfer mode information MODE. In one specific example, as described later, when the information processing unit 9 or the DMA controller 20 makes the write request by the non-posted transfer (MODE=0) to the memory 70, the memory controller 60 may generate the response signal RE at the timing of the end of the data writing to the memory 70. The memory controller 60 may supply the response signal RE to the device that has made the write request, through the interconnect unit 30. In other words, in this case, the non-posted transfer may be performed. Moreover, when the information processing unit 9 or the DMA controller 20 makes the write request by the posted transfer (MODE=1) to the memory 70, the memory controller 60 may generate the response signal RE at the timing at which the data writing has been performed to the write buffer 64 incorporated (described later). The memory controller 60 may supply the response signal RE to the device that has made the write request, through the interconnect unit 30. In other words, in this case, the posted transfer may be performed.

The memories 50 and 70 may store data, and serve as a workspace memory of the information processing unit 9. The memories 50 and 70 may each include, for example, DRAM (Dynamic Random Access Memory). The memory 50 may receive the control command COM and the address ADD from the memory controller 40, and supply or receive the data DATA to or from the memory controller 40. Similarly, the memory 70 may receive the control command COM and the address ADD from the memory controller 60, and supply or receive the data DATA to or from the memory controller 60.

[Memory Controller 40]

FIG. 2 illustrates one example of a configuration of the memory controller 40. The memory controller 40 may include a write interface 41, a read interface 48, and a controller 49.

The write interface 41 may be an interface related to write access. In one specific example, the write interface 41 may temporarily store the write address WrADD and the write data WrDATA supplied from the interconnect unit 30, and transfer the write address WrADD and the write data WrDATA to the controller 49. Moreover, the write interface 41 may have the function of generating the response signal RE on the basis of the write address WrADD. The write interface 41 may include the write buffer 44, a response controller 80 and a response signal generator 43.

The write buffer 44 may be a buffer memory that temporarily stores the write address WrADD and the write data WrDATA. Moreover, the write buffer 44 may supply the controller 49 with the write address WrADD and the write data WrDATA stored, on the basis of an instruction from the controller 49.

The response controller 80 may generate a parameter PW, on the basis of the write address WrADD.

FIG. 3 illustrates one example of a configuration of the response controller 80. The response controller 80 may include an identifier acquiring unit 81, a transfer mode information acquiring unit 85, a register 82, a logical AND operating unit 83, a comparison unit 84, and a logical AND circuit 86.

The identifier acquiring unit 81 may acquire the identifier MI from the write address WrADD. The transfer mode information acquiring unit 85 may acquire the transfer mode information MODE from the write address WrADD.

The register 82 may store parameters MIMask and MIMatch. The parameters MImask and MIMatch may each be an 8-bit parameter. In the memory controller 40, the parameter MImask may be set as "0x10" in the hexadecimal number notation ("00010000" in the binary number notation), while the parameter MIMatch may be set as "0x10".

The logical AND circuit 83 may obtain a logical AND of a value of each bit of the identifier MI and a value of a corresponding bit of the parameter MIMask (in this example, "0x10"), to generate an 8-bit parameter. In other words, in this example, the logical AND circuit 83 may mask the bits other than the bit b4 of the identifier MI. In one specific example, the logical AND circuit 83 may generate a parameter, a value of a bit b4 of which is a value of the bit b4 of the identifier MI, and values of bits b0 to b3 and b5 to b7 of which are "0". The logical AND circuit 83 may output the parameter thus generated.

The comparison unit 84 may compare the parameter outputted by the logical AND circuit 83 with the 8-bit parameter MIMatch (in this example, "0x10"). The comparison unit 84 may output a comparison result as a parameter DPW. In one specific example, the comparison unit 84 may allow the parameter DPW to be "1" upon coincidence of these parameters. The comparison unit 84 may allow the parameter DPW to be "0" upon non-coincidence of these parameters.

FIG. 4 illustrates relation between the identifier MI and the parameter DPW. In the memory controller 40, the parameter DPW may be "1" when the information processing unit 9 makes the write request, whereas the parameter DPW may be "0" when the DMA controller 20 makes the write request. In other words, when the information processing unit 9 makes the write request, the parameter DPW may be "1" because the bit b4 of the identifier MI of the information processing unit 9 is "1". When the DMA controller 20 makes the write request, the parameter DPW may be "0" because the bit b4 of the identifier MI of the DMA controller 20 is "0". Thus, in the response controller 80, the parameter DPW may be generated on the basis of the value of the bit b4 of the identifier MI.

The logical AND circuit 86 may obtain a logical AND of a reverse value of the parameter DPW and the value of the transfer mode information MODE. The logical AND circuit 86 may output a result thus obtained, as the parameter PW. The parameter PW having a value of "1" may indicate the posted transfer. The parameter PW having the value of "0" may indicate the non-posted transfer.

With this configuration, the response controller 80 may allow the parameter PW to be "0", because the parameter DPW is "1" as summarized in FIG. 4, when the information processing unit 9 makes the write request. Moreover, the response controller 80 may output the value of the transfer mode information MODE as the parameter PW, because the parameter DPW is "0" as summarized in FIG. 4, when the DMA controller 20 makes the write request.

The response signal generator 43 may generate the response signal RE, on the basis of the parameter PW and a control signal supplied from the controller 49. In one specific example, upon receipt of the parameter PW having the value of "1" from the response controller 80, the response signal generator 43 may generate the response signal RE at timing of the receipt. In other words, the response signal generator 43 may generate the response signal RE at the timing at which the data writing has been performed to the write buffer 44. That is, in this case, the posted transfer may be performed. Moreover, upon the receipt of the parameter PW having the value of "0", the response signal generator 43 may generate the response signal RE at timing of receipt, from the controller 49, of a control signal that indicates the end of the data writing to the memory 50. That is, in this case, the non-posted transfer may be performed.

The read interface 48 may be an interface related to read access. The read interface 48 may perform predetermined processing on the basis of the read address RdADD supplied from the interconnect unit 30, and transfer the read address RdADD to the controller 49. The read interface 48 may perform predetermined processing on the basis of the read data RdDATA supplied from the controller 49, and transfer the read data RdDATA to the interconnect unit 30.

The controller 49 may control the operation of the memory 50 on the basis of instructions from the write interface 41 and the read interface 48. In one specific example, the controller 49 may generate the control command COM such as a write command and a read command, on the basis of the write address WrADD and the read address RdADD. The controller 49 may supply the control command COM to the memory 50. Moreover, the controller 49 may generate the address ADD, on the basis of the write address WrADD and the read address RdADD. The controller 49 may supply the address ADD to the memory 50. Further, the controller 49 may supply the memory 50 with the write data WrDATA supplied from the write interface 41, as the data DATA. Furthermore, the controller 49 may supply the read interface 48 with the data DATA supplied from the memory 50, as the read data RdDATA.

[Memory Controller 60]

FIG. 5 illustrates one example of a configuration of the memory controller 60. The memory controller 60 may include a read interface 68, a write interface 61, and a controller 69.

The read interface 68 may be an interface related to read access, as with the read interface 48. Unlike the read interface 48, the read interface 68 may have the snoop mechanism. In one specific example, upon receipt of the read request for data stored in the write buffer 64 (described later) of the write interface 61, the read interface 68 may read the data from the write buffer 64. The read interface 68 may output the data thus read, as the read data RdDATA. Hence, in the memory controller 60 and the memory 70, it is possible to suppress the coherency-related disadvantage.

The write interface 61 may be an interface related to write access, as with the write interface 41. The write interface 61 may include the write buffer 64, a response controller 90, and a response signal generator 63.

The write buffer 64 may be a buffer memory that temporarily stores the write address WrADD and the write data WrDATA, as with the write buffer 44. Moreover, the write buffer 64 may supply the read interface 68 with the write data WrDATA stored in the write buffer 64, on the basis of an instruction from the read interface 68.

The response controller 90 may generate the parameter PW on the basis of the write address WrADD, as with the response controller 80. A configuration of the response controller 90 may be same as that of the response controller 80 (FIG. 3). Here, in the response controller 90, the parameter MIMask may be set as "0x00". Accordingly, in the memory controller 60, the parameter DPW may be "0", regardless of whether the information processing unit 9 or the DMA controller 20 makes the write request to the memory 70, as summarized in FIG. 4. Therefore, the response controller 90 may output the value of the transfer mode information MODE, as the parameter PW.

The response signal generator 63 may generate the response signal RE, on the basis of the parameter PW and a control signal supplied from the controller 69, as with the response signal generator 43. The controller 69 may control the operation of the memory 70, on the basis of instructions from the write interface 61 and the read interface 68, as with the controller 49.

Here, the cash 10, the cores 11 and 12, and the DMA controller 20 each correspond to one specific example of a "master device" in the disclosure. The memory controller 40 corresponds to one specific example of a "slave device" in the disclosure. The memory 50 corresponds to one specific example of a "device to be accessed" in the disclosure. The write request corresponds to one specific example of a "request for access" in the disclosure. The transfer mode information MODE corresponds to one specific example of "request information" in the disclosure.

[Operation and Workings]

Description is given next of operation and workings of the bus system 1 according to the embodiment.

[Outline of Overall Operation]

First, an outline of overall operation of the bus system 1 is described with reference to FIG. 1 and other figures. The information processing unit 9 may perform the operation processing. The DMA controller 20 may control the DMA transfer. The interconnect unit 30 may arbitrate the access to the memories 50 and 70 by the information processing unit 9 and the DMA controller 20. The memory controller 40 may control the operation of the memory 50, and generate the response signal RE. At this occasion, the memory controller 40 may decide the timing of the generation of the response signal RE, on the basis of the identifier MI and the transfer mode information MODE. The memory controller 60 may control the operation of the memory 70, and generate the response signal RE. At this occasion, the memory controller 60 may decide the timing of the generation of the response signal RE, on the basis of the transfer mode information MODE. The memories 50 and 70 may store the data.

Next, detailed operation of the bus system 1 is described with reference to three operation examples.

Operation Example 1

First, an operation example 1 is described in which the cash 10 of the information processing unit 9 makes the write request by the posted transfer to the memory 50.

FIG. 6 illustrates the operation example 1 of the bus system 1. In FIG. 6, a signal denoted by a thick solid line denotes a signal that becomes active prior to the timing of the generation of the response signal RE. A signal denoted by a thick broken line denotes a signal that becomes active after the timing of the generation of the response signal RE.

First, the cash 10 of the information processing unit 9 may make the write request by the posted transfer to the memory 50. In one specific example, the information processing unit 9 may generate the write address WrADD and the write data WrDATA. The information processing unit 9 may supply the write address WrADD and the write data WrDATA to the interconnect unit 30. The write address WrADD may include the identifier MI of the cash 10 ("0x10") and the transfer mode information MODE having the value of "1" (MODE=1). In other words, because the cash 10 requests for the posted transfer, the transfer mode information MODE may be set as "1". Moreover, the interconnect unit 30 may transfer, to the memory controller 40, the write address WrADD and the write data WrDATA supplied from the information processing unit 9. Further, the memory controller 40 may receive the write address WrADD and the write data WrDATA from the interconnect unit 30. The memory controller 40 may allow the write buffer 44 to temporarily store the write address WrADD and the write data WrDATA. Thereafter, the memory controller 40 may perform the data writing to the memory 50, on the basis of the information stored in the write buffer 44.

The response controller 80 of the memory controller 40 may generate the parameter PW having the value of "0", on the basis of the write address WrADD. In one specific example, because the identifier MI included in the write address WrADD is "0x10", the parameter DPW may be "1", and the parameter PW may be "0". Accordingly, the response signal generator 43 may generate the response signal RE at the timing of the end of the data writing to the memory 50. Thus, in the bus system 1, the non-posted transfer may be performed.

In some cases, the information processing unit 9 may make the write request by the posted transfer, and thereafter, make the read request to the address to which the write request has been made. To be specific, there may be such a case in performing, for example, so-called eviction operation. For example, in performing the eviction operation, with the information processing unit 9 constituted with use of the processor Cortex-A9 MPCore and the level 2 cash controller L2C-310 available from ARM Ltd., the transfer mode information MODE (AWCACHE [0]) may be set as "1". In other words, in this case, the information processing unit 9 may make the write request by the posted transfer. In such a case, as described above, the memory controller 40 may determine that the non-posted transfer ought to be performed, and generate the response signal RE at the timing of the end of the data writing to the memory 50. This makes it possible to reduce the possibility that old data before re-writing be read from the memory 50, in the read access after the write access. Hence, it is possible to suppress the coherency-related disadvantage.

As described, in the bus system 1, the memory controller 40 may determine that the non-posted transfer ought to be performed, when the information processing unit 9 makes the write request by the posted transfer to the memory 50. Hence, in the bus system 1, it is possible to suppress the coherency-related disadvantage.

Operation Example 2

Next, an operation example 2 is described in which the DMA controller 20 makes the write request by the posted transfer to the memory 50.

FIG. 7 illustrates the operation example 2 of the bus system 1. First, the DMA controller 20 may make the write request by the posted transfer to the memory 50. In one specific example, the DMA controller 20 may generate the write address WrADD and the write data WrDATA. The DMA controller 20 may supply the write address WrADD and the write data WrDATA to the interconnect unit 30. The write address WrADD may include the identifier MI of the DMA controller 20 ("0x20") and the transfer mode information MODE having the value of "1" (MODE=1). The memory controller 40 may receive the write address WrADD and the write data WrDATA, through the interconnect unit 30. Moreover, the memory controller 40 may allow the write buffer 44 to temporarily store the write address WrADD and the write data WrDATA.

The response controller 80 of the memory controller 40 may generate the parameter PW having the value of "1", on the basis of the write address WrADD. In one specific example, because the identifier MI included in the write address WrADD is "0x20", the parameter DPW may become "0". Accordingly, the parameter PW may become "1", i.e., the same value as the value of the transfer mode information MODE. The response signal generator 43 may, therefore, generate the response signal RE, at the timing at which the data writing has been performed to the write buffer 44. Moreover, the memory controller 40 may perform the data writing to the memory 50, on the basis of the information stored in the write buffer 44. Thus, in the bus system 1, the posted transfer may be performed.

The DMA controller 20 may often make a series of write transfer through a plurality of write requests. In what follows, description is made with reference to an exemplary case in which 1 kilobyte (=4×256 bytes) transfer is performed through four write requests. In such a case, for example, the DMA controller 20 may make the write request by the posted transfer three times, and thereafter, make the write request by the non-posted transfer once. At this occasion, as requested, the memory controller 40 may determine that the posted transfer ought to be performed with respect to first three write requests, and determine that the non-posted transfer ought to be performed with respect to the one write request afterward. Accordingly, in the bus system 1, it is possible to make responses, at earlier timing, to the first three write requests. This leads to enhancement in transfer performance. Moreover, with respect to the one write request afterward, the response signal RE may be generated at the timing of the end of the data writing to the memory 50. Hence, it is possible to suppress the coherency-related disadvantage.

As described, in the bus system 1, when the DMA controller 20 makes the write request to the memory 50, the memory controller 40 may perform the posted transfer or the non-posted transfer, as requested. In other words, because the DMA controller 20 makes the write requests meticulously, the memory controller 40 may grant the write requests. Hence, in the bus system 1, it is possible to suppress the coherency-related disadvantage, and to enhance the transfer performance.

Operation Example 3

Next, an operation example 3 is described in which the cash 10 of the information processing unit 9 makes the write request by the posted transfer to the memory 70.

FIG. 8 illustrates the operation example 3 of the bus system 1. First, the cash 10 of the information processing unit 9 may make the write request by the posted transfer to the memory 70. In one specific example, the information processing unit 9 may generate the write address WrADD and the write data WrDATA. The information processing unit 9 may supply the write address WrADD and the write data WrDATA to the interconnect unit 30. The write address WrADD may include the identifier MI of the cash 10 ("0x10") and the transfer mode information MODE having the value of "1" (MODE=1). The memory controller 60 may receive the write address WrADD and the write data WrDATA, through the interconnect unit 30. Moreover, the memory controller 60 may allow the write buffer 64 to temporarily store the write address WrADD and the write data WrDATA.

The response controller 90 of the memory controller 60 may generate the parameter PW having the value of "1", on the basis of the write address WrADD. In one specific example, in the memory controller 60, because the parameter DPW is "0" (FIG. 4), the parameter PW may become "1", i.e., the same value as the value of the transfer mode information MODE. Accordingly, the response signal generator 43 may generate the response signal RE at the timing at which the data writing has been performed to the write buffer 64. Moreover, the memory controller 60 may perform the data writing to the memory 70, on the basis of the information stored in the buffer memory 64. Thus, in the bus system 1, the posted transfer may be performed. Furthermore, thereafter, when the memory controller 60 receives the read request for the data stored in the write buffer 64, the memory controller 60 may read the data from the write buffer 64. The memory controller 60 may output the data thus read, as the read data RdDATA.

As described, in the bus system 1, when the information processing unit 9 makes the write request by the posted transfer to the memory 70, the memory controller 60 may determine that the posted transfer ought to be performed, as requested. Accordingly, in the bus system 1, it is possible to make the response at the earlier timing, leading to the enhancement in the transfer performance. Hence, in the bus system 1, it is possible to increase a processing speed in the whole system. In particular, in the posted transfer, it is possible to effectively utilize the snoop mechanism of the memory controller 60. Hence, it is possible to suppress the coherency-related disadvantage, and to enhance the transfer performance.

Next, description is given on workings of the embodiment, in comparison with some comparative examples.

Comparative Example 1

FIG. 9 illustrates one example of a bus system 1R according to a comparative example 1. The bus system 1R may include an information processing unit 9R, a DMA controller 20R, the interconnect unit 30, a memory controller 40R, and a memory 50. The information processing unit 9R and the DMA controller 20R may be devoid of the assignment of the identifiers MI. The memory controller 40R may have the snoop mechanism. Moreover, the memory controller 40R may decide the timing of the generation of the response signal RE, on the basis of the transfer mode information MODE.

In the example in FIG. 9, the information processing unit 9R may make the write request by the posted transfer to the memory 50. In one specific example, first, the information processing unit 9R may generate the write address WrADD and the write data WrDATA. The information processing unit 9R may supply the write address WrADD and the write data WrDATA to the interconnect unit 30. The write address WrADD may include the transfer mode information MODE having the value of "1" (MODE=1). Moreover, the memory controller 40 may receive the write address WrADD and the write data WrDATA, through the interconnect unit 30. The memory controller 40R may allow the write buffer incorporated to temporarily store the write address WrADD and the write data WrDATA.

The memory controller 40R may generate the response signal RE at the timing at which the data writing has been performed to the write buffer incorporated, because the value of the transfer mode information MODE is "1". Moreover, the memory controller 40R may perform the data writing to the memory 50, on the basis of the information stored in the write buffer. Thus, in the bus system 1R, the posted transfer may be performed. Moreover, thereafter, when the memory controller 40R receives the read request for the data stored in the write buffer, the memory controller 40R may read the data from the write buffer. The memory controller 40R may output the data thus read, as the read data RdDATA.

In the bus system 1R according to the comparative example 1, the memory controller 40R may include the snoop mechanism. This makes it possible to suppress the coherency-related disadvantage even in performing the posted transfer. However, the snoop mechanism may include a large scale of circuit, causing possibility of an increase in costs.

In contrast, in the bus system 1 according to the embodiment, when the information processing unit 9 makes the write request by the posted transfer, the memory controller 40 may determine that the non-posted transfer ought to be performed. This makes it possible to suppress the coherency-related disadvantage without providing the snoop mechanism. Hence, it is possible to decrease a circuit scale, and suppress the increase in the costs.

Comparative Example 2

FIGS. 10 and 11 illustrate one example of a bus system 1S according to a comparative example 2. The bus system 1S may include the information processing unit 9R, the DMA controller 20R, the interconnect unit 30, a memory controller 40S, and the memory 50. The memory controller 40S may be devoid of the snoop mechanism. Moreover, the memory controller 40S may constantly determine that the non-posted transfer ought to be performed, regardless of the transfer mode information MODE received.

In the example in FIG. 10, the information processing unit 9R may make the write request by the posted transfer to the memory 50. In one specific example, first, the information processing unit 9R may generate the write address WrADD and the write data WrDATA. The information processing unit 9R may supply the write address WrADD and the write data WrDATA to the interconnect unit 30. The write address WrADD may include the transfer mode information MODE having the value of "1" (MODE=1). Moreover, the memory controller 40S may receive the write address WrADD and the write data WrDATA, through the interconnect unit 30. The memory controller 40S may allow the write buffer incorporated to temporarily store the write address WrADD and the write data WrDATA. Thereafter, the memory controller 40S may perform the data writing to the memory 50, on the basis of the information stored in the write buffer. The memory controller 40S may generate the response signal RE at the timing of the end of the data writing to the memory 50. Thus, in the bus system 1S, the non-posted transfer may be performed.

In the example in FIG. 11, the DMA controller 20R may make the write request by the posted transfer to the memory 50. In one specific example, first, the DMA controller 20R may generate the write address WrADD and the write data WrDATA. The DMA controller 20R may supply the write address WrADD and the write data WrDATA to the interconnect unit 30. The write address WrADD may include the transfer mode information MODE having the value of "1" (MODE=1). Moreover, the memory controller 40S may receive the write address WrADD and the write data WrDATA, through the interconnect unit 30. The memory controller 40S may allow the write buffer incorporated to temporarily store the write address WrADD and the write data WrDATA. Thereafter, the memory controller 40S may perform the data writing to the memory 50, on the basis of the information stored in the write buffer. The memory controller 40S may generate the response signal RE at the timing of the end of the data writing to the memory 50. Thus, in the bus system 1S, the non-posted transfer may be performed.

In the bus system 1S according to the comparative example 2, the memory controller 40S may constantly determine that the non-posted transfer ought to be performed, regardless of the transfer mode information MODE received. This makes it possible to suppress the coherency-related disadvantage. However, the non-posted transfer may be performed even when the DMA controller 20R makes the write request by the posted transfer. This leads to possibility of a lowered processing speed in the whole system. In other words, there is low possibility that the DMA controller 20R makes the write request, and immediately thereafter, makes the read request to the same address. Accordingly, making the response at delayed timing in this way causes a lowered transfer speed. This results in possibility of the lowered processing speed in the whole system.

In contrast, in the bus system 1 according to the embodiment, the memory controller 40 may determine, on the basis of the identifier MI, whether the posted transfer or the non-posted transfer ought to be performed. Accordingly, for example, the non-posted transfer may be performed when the information processing unit 9 makes the write request by the posted transfer, whereas the posted transfer may be performed when the DMA controller 20 makes the write request by the posted transfer. Thus, in the bus system 1, different types of transfer may be performed depending on the device that makes the write request. Hence, it is possible to enhance the transfer performance while suppressing the coherency-related disadvantage.

Comparative Example 3

FIGS. 12 and 13 illustrate one example of a bus system 1T according to a comparative example 3. The bus system 1T may include an information processing unit 9T, the DMA controller 20R, the interconnect unit 30, memory controllers 40T and 60T, and the memories 50 and 70. The information processing unit 9T may constantly make the write request by the non-posted transfer to the memories 50 and 70. The memory controller 40T may be devoid of the snoop mechanism. The memory controller 60T may include the snoop mechanism. The memory controllers 40T and 60T may decide the timing of the generation of the response signal RE, on the basis of the transfer mode information MODE.

In the example in FIG. 12, the information processing unit 9T may make the write request by the non-posted transfer to the memory 50. In one specific example, first, the information processing unit 9T may generate the write address WrADD and the write data WrDATA. The information processing unit 9T may supply the write address WrADD and the write data WrDATA to the interconnect unit 30. The write address WrADD may include the transfer mode information MODE having the value of "0" (MODE=0). Moreover, the memory controller 40T may receive the write address WrADD and the write data WrDATA, through the interconnect unit 30. The memory controller 40T may allow the write buffer incorporated to temporarily store the write address WrADD and the write data WrDATA. Thereafter, the memory controller 40T may perform the data writing, on the basis of the information stored in the write buffer. Furthermore, the memory controller 40T may generate the response signal RE at the timing of the end of the data writing to the memory 50. Thus, in the bus system 1T, the non-posted transfer may be performed.

In the example in FIG. 13, the information processing unit 9T may make the write request by the non-posted transfer to the memory 70. In one specific example, first, the information processing unit 9T may generate the write address WrADD and the write data WrDATA. The information processing unit 9T may supply the write address WrADD and the write data WrDATA to the interconnect unit 30. The write address WrADD may include the transfer mode information MODE having the value of "0" (MODE=0). Moreover, the memory controller 60T may receive the write address WrADD and the write data WrDATA, through the interconnect unit 30. The memory controller 60T may allow the write buffer incorporated to temporarily store the write address WrADD and the write data WrDATA. Thereafter, the memory controller 60T may perform the data writing to the memory 70, on the basis of the information stored in the write buffer. Furthermore, the memory controller 60T may generate the response signal RE at the timing of the end of the data writing to the memory 70. Thus, in the bus system 1T, the non-posted transfer may be performed. Moreover, thereafter, when the memory controller 60T receives the read request for the data stored in the write buffer, the memory controller 60T may read the data from the write buffer. The memory controller 60T may output the data thus read, as the read data RdDATA.

In the bus system 1T according to the comparative example 3, the information processing unit 9T may constantly make the write request by the non-posted transfer. This makes it possible to suppress the coherency-related disadvantage. However, constantly performing the non-posted transfer in spite of the snoop mechanism of the memory controller 60T keeps the snoop mechanism from working effectively and exhibiting its performance.

In contrast, in the bus system 1 according to the embodiment, the memory controllers 40 and 60 may each determine independently whether the posted transfer or the non-posted transfer ought to be performed. Accordingly, for example, when the information processing unit 9 makes the write request by the posted transfer, the memory controller 40 devoid of the snoop mechanism may select the non-posted transfer, allowing for the suppression of the coherency-related disadvantage. Meanwhile, the memory controller 60 including the snoop mechanism may select the posted transfer, allowing for the enhancement of the transfer performance. Hence, it is possible to suppress the coherency-related disadvantage, and to enhance the transfer performance, even in a case of a mixture of the device devoid of the snoop mechanism and the device including the snoop mechanism.

[Effects]

As described, in this embodiment, determination may be made, on the basis of the identifier, on whether posted transfer or non-posted transfer ought to be performed. Accordingly, for example, when an information processing unit makes a write request by the posted transfer, selecting the non-posted transfer makes it possible to suppress a coherency-related disadvantage. When a DMA controller makes the write request by the posted transfer, selecting the posted transfer makes it possible to enhance transfer performance.

In this embodiment, a plurality of memory controllers may each determine independently whether the posted transfer or the non-posted transfer ought to be performed. Accordingly, for example, a memory controller devoid of a snoop mechanism may select the non-posted transfer, allowing for the suppression of the coherency-related disadvantage. A memory controller including the snoop mechanism may select the posted transfer, allowing for the enhancement in the transfer performance.

Modification Example 1

In the forgoing embodiment, in the response controller 80, the pair of parameters MIMask and MIMatch may be used, but this is non-limiting. Instead, a plurality of pairs of parameters MIMask and MIMatch may be used. FIG. 14 illustrates an exemplary case with use of two pairs of parameters MIMask and MIMatch. A response controller 80A may include a register 82A, logical AND operating units 831 and 832, comparison units 841 and 842, and a logical OR circuit 87A. The register 82A may store parameters MIMask1 and MIMatch1, and parameters MIMask2 and MIMatch2. The logical AND operating unit 831 may obtain a logical AND of a value of each bit of the identifier MI and a value of a corresponding bit of the parameter MIMask1, to generate an 8-bit parameter. The comparison unit 841 may compare the parameter outputted by the logical AND operating unit 831 with the 8-bit parameter MIMatch1. The comparison unit 841 may output a comparison result. The logical AND operating unit 832 may obtain a logical AND of a value of each bit of the identifier MI and a value of a corresponding bit of the parameter MIMask2, to generate an 8-bit parameter. The comparison unit 842 may compare the parameter outputted by the logical AND operating unit 832 with the 8-bit parameter MIMatch2. The comparison unit 842 may output a comparison result. The logical OR circuit 87A may obtain a logical OR of the comparison result in the comparison unit 841 and the comparison result in the comparison unit 842. The logical OR circuit 87A may output the logical OR thus obtained, as the parameter DPW. Thus, using the plurality of pairs of parameters MIMask and MIMatch makes it possible to control the write access with a higher degree of freedom.

Modification Example 2

In the forgoing embodiment, the memory controller 40 may identify the device that has made the write request, on the basis of the identifier MI, but this is non-limiting. In the following, this modification example is described in details.

FIGS. 15 and 16 illustrate one example of a bus system 1B according to this modification example. The bus system 1B may include an information processing unit 9B, a DMA controller 20B, the interconnect unit 30, memory controllers 40B and 60B, and the memories 50 and 70. FIG. 17 illustrates one example of a configuration of a response controller 80B related to the memory controllers 40B and 60B.

The information processing unit 9B and the DMA controller 20B may assign a transfer identifier ID, for each transfer (access). In this example, the transfer identifier ID assigned by the information processing unit 9B may range from 0 to 127 both inclusive. The transfer identifier ID assigned by the DMA controller 20B may range from 128 to 255 both inclusive. Moreover, the information processing unit 9B and the DMA controller 20B may generate the write address WrADD including the transfer identifier ID. The memory controllers 40B and 60B are able to identify, with use of the transfer identifier ID included in the write address WrADD, the device that has made the write request or the read request. In other words, in the forgoing embodiment, the memory controllers 40 and 60 may identify, with use of the identifier MI, the device that has made the write request or the read request. Meanwhile, the memory controllers 40B and 60B may identify, with use of the transfer identifier ID, the device that has made the write request or the read request.

The response controller 80B may include a transfer identifier acquiring unit 81B and a register 82B. The transfer identifier acquiring unit 81B may acquire the transfer identifier ID from the write address WrADD. The register 82B may store parameters IDMask and IDMatch. The parameter IDMask may be set as "0x80" in the hexadecimal number notation ("10000000" in the binary number notation). The parameter IDMatch may be set as "0x00".

In the example in FIG. 15, the information processing unit 9B may make the write request by the posted transfer to the memory 50. In one specific example, first, the information processing unit 9B may generate the write address WrADD and the write data WrDATA. The information processing unit 9B may supply the write address WrADD and the write data WrDATA to the interconnect unit 30. The write address WrADD may include the transfer identifier ID that ranges from 0 to 127 both inclusive, and the transfer mode information MODE having the value of "1" (MODE=1). Moreover, the memory controller 40B may receive the write address WrADD and the write data WrDATA, through the interconnect unit 30. The memory controller 40B may allow the write buffer 44 incorporated to temporarily store the write address WrADD and the write data WrDATA. Thereafter, the memory controller 40B may perform the data writing to the memory 50, on the basis of the information stored in the write buffer 44.

The response controller 80B of the memory controller 40B may generate the parameter PW having the value of "0", on the basis of the write address WrADD. In other words, because the transfer identifier ID included in the write address WrADD ranges from 0 to 127 both inclusive, the parameter DPW may become "1", and the parameter PW may become "0". Accordingly, the memory controller 40B may generate the response signal RE at the timing of the end of the data writing to the memory 50. Thus, in the bus system 1B, the non-posted transfer may be performed.

In the example in FIG. 16, the DMA controller 20B may make the write request by the posted transfer to the memory 50. In one specific example, first, the DMA controller 20B may generate the write address WrADD and the write data WrDATA. The DMA controller 20B may supply the write address WrADD and the write data WrDATA to the interconnect unit 30. The write address WrADD may include the transfer identifier ID that ranges from 128 to 255 both inclusive, and the transfer mode information MODE having the value of "1" (MODE=1). Moreover, the memory controller 40B may receive the write address WrADD and the write data WrDATA, through the interconnect unit 30. The memory controller 40B may allow the write buffer 44 incorporated to temporarily store the write address WrADD and the write data WrDATA.

The response controller 80B of the memory controller 40B may generate the parameter PW having the value of "1", on the basis of the write address WrADD. In other words, because the transfer identifier ID included in the write address WrADD ranges from 128 to 255 both inclusive, the parameter DPW may become "0". Accordingly, the parameter PW may become "1", i.e., the same value as the value of the transfer mode information MODE. The memory controller 40B may, therefore, generate the response signal RE at the timing at which the data writing has been performed to the write buffer 44. Thus, in the bus system 1B, the posted transfer may be performed. Moreover, the memory controller 40B may perform the data writing to the memory 50, on the basis of the information stored in the write buffer 44.

With this configuration as well, it is possible to produce similar effects to those of the forgoing embodiment. It is to be noted that this is non-limiting. For example, memory regions (address regions) may be separately provided for access by an information processing unit and access by a DMA controller. A memory controller may identify the device that has made the write request, on the basis of address information.

Modification Example 3

In the forgoing embodiment, the information processing unit 9 and the DMA controller 20 may generate the write address WrADD including the identifier MI, but this is non-limiting. Instead, for example, as in a bus system 1C illustrated in FIG. 18, an interconnect unit may generate the write address WrADD including the identifier MI. The bus system 1C may include an information processing unit 9C, a DMA controller 20C, an interconnect unit 30C, the memory controllers 40 and 60, and the memories 50 and 70. The information processing unit 9C and the DMA controller 20C may generate the write address WrADD that is devoid of the assignment of the identifier MI. The interconnect unit 30C may include an identifier generator 31C and an identifier generator 32C. The identifier generator 31C may add the identifier MI of the information processing unit 9C (e.g., "0x10") to the write address WrADD supplied from the information processing unit 9C. The identifier generator 32C may add the identifier MI of the DMA controller 20C (e.g., "0x20") to the write address WrADD supplied from the DMA controller 20C. With this configuration as well, it is possible to produce similar effects to those of the forgoing embodiment.

Modification Example 4

In the forgoing embodiment, the memory controllers 40 and 60 may control the timing of the generation of the response signal RE, but this is non-limiting. Instead, for example, an interconnect unit may control the timing of the generation of the response signal RE. In the following, detailed description is given of an interconnect unit 30D according to this modification example.

FIG. 19 illustrates one example of a configuration of the interconnect unit 30D. The interconnect unit 30D may include response controllers 33D and 35D, response signal generators 34D and 36D, and a processor 37D. The response controller 33D may generate the parameter PW, on the basis of the write address WrADD supplied from the information processing unit 9C through the bus B1, as with the response controller 80 (FIG. 3). The response signal generator 34D may generate the response signal RE, on the basis of the parameter PW generated by the response controller 33D and a control signal supplied from the processor 37D, as with the response signal generator 43. The response signal generator 34D may supply the response signal RE to the information processing unit 9C through the bus B1, as with the response signal generator 43. The response controller 35D may generate the parameter PW, on the basis of the write address WrADD supplied from the DMA controller 20 through the bus B2, as with the response controller 80 (FIG. 3). The response signal generator 36D may generate the response signal RE, on the basis of the parameter PW generated by the response controller 35D and a control signal supplied from the processor 37D, as with the response signal generator 43. The response signal generator 36D may supply the response signal RE to the DMA controller 20 through the bus B2. The processor 37D may arbitrate the access to the memories 50 and 70 by the information processing unit 9 and the DMA controller 20. With this configuration as well, it is possible to produce similar effects to those of the forgoing embodiment.

Although description has been made by giving the embodiment and the modifications as mentioned above, the contents of the technology are not limited to the above-mentioned example embodiments and may be modified in a variety of ways.

For example, in the forgoing example embodiments, one interconnect unit may be provided, but this is non-limiting. Instead, as in a bus system 2 illustrated in FIG. 20, a plurality of interconnect units (in this example, two interconnect units 131 and 132) may be provided. In this example, the information processing unit 9 and the DMA controller 20 may access the memories 50 and 70 through the two interconnect units 131 and 132.

Moreover, for example, in the forgoing example embodiments, the technology is applied to memory access, but this is non-limiting. The technology may have various applications that involve making a response to a request.

It is to be noted that effects described herein are merely exemplified and not limitative, and effects of the disclosure may be other effects or may further include other effects.

It is to be noted that the technology may have the following configuration.

(1) An access control method, including:

allowing one master device of a plurality of master devices to generate a request for access to a device to be accessed;

allowing a slave device to identify, on a basis of the request for the access, the one master device that has generated the request for the access; and allowing the slave device to make a response to the one master device, at response timing that corresponds to the one master device identified.

(2) The access control method according to (1), wherein the response timing is first timing or second timing, the first timing being timing at which the slave device receives the request for the access, and the second timing being timing at which the device to be accessed makes an end of processing based on the request for the access.

(3) The access control method according to (2), wherein the request for the access includes request information that indicates a request of the one master device regarding the response timing, and the allowing the slave device to make the response includes allowing the slave device to decide the response timing, on a basis of the one master device identified and the request information.

(4) The access control method according to (3), wherein the allowing the slave device to decide the response timing includes allowing the slave device to decide the response timing, on the basis of the one master device identified, on a condition that the request information indicates the first timing.

(5) The access control method according to (3) or (4), wherein
the allowing the slave device to decide the response timing includes taking the second timing as the response timing, on a condition that the request information indicates the second timing.

(6) The access control method according to any one of (2) to (5), wherein
the slave device includes a buffer memory, and
the first timing is timing at which the request for the access has been stored in the buffer memory.

(7) The access control method according to any one of (1) to (6), further including
assigning an identifier to each of the plurality of master devices, the identifier being different for each of the plurality of master devices, wherein
the allowing the slave device to identify the one master device includes allowing the slave device to identify the one master device on a basis of the identifier.

(8) The access control method according to (7), wherein
the allowing the one master device to generate the request for the access includes allowing the one master device to perform processing to allow the request for the access to include the identifier assigned to the one master device.

(9) The access control method according to (7), further including
allowing a device on a signal path between the one master device and the slave device to perform processing to allow the request for the access to include the identifier assigned to the one master device.

(10) The access control method according to any one of (1) to (9), wherein
the slave device controls the device to be accessed.

(11) The access control method according to any one of (1) to (10), wherein
the device to be accessed is a memory, and
the request for the access is a write request.

(12) A bus system, including:
a plurality of master devices that are able to generate a request for access to a device to be accessed; and
a slave device that makes, on a basis of the request for the access, a response to one master device of the plurality of master devices that has generated the request for the access, at response timing that corresponds to the one master device.

(13) A semiconductor device, including:
a plurality of master devices that are able to generate a request for access to a device to be accessed; and
a slave device that makes, on a basis of the request for the access, a response to one master device of the plurality of master devices that has generated the request for the access, at response timing that corresponds to the one master device.

This application claims the benefit of Japanese Priority Patent Application JP2014-183777 filed Sep. 10, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A bus system comprising:
master devices that are electrically connected to an interconnect unit in a manner that permits one of the master devices to:
output, to the interconnect unit, a request for a transfer of data between an accessible device and the one of the master devices; and
slave devices that are electrically connected to the interconnect unit in a manner that permits one of the slave devices to:
receive, from the interconnect unit, the request,
extract, from the request, an identifier that identifies the one of the master devices,
extract, from the request, transfer mode information that identifies a manner of the transfer, and
generate, from the identifier and the transfer mode information, a response signal that the one of the slave devices supplies to the one of the master devices.

2. The bus system according to claim 1, wherein the one of the slave devices is configured to:
output, when the manner of the transfer is a non-posted transfer, the response signal to the one of the master devices upon the completion of the transfer.

3. The bus system according to claim 1, wherein the one of the slave devices is configured to:
output, when the manner of the transfer is a posted transfer, the response signal to the one of the master devices when the one of the slave devices receives the request.

4. The bus system according to claim 1, wherein the one of the slave devices is configured to:
extract, from the request, an address in the accessible device.

5. The bus system according to claim 4, wherein the address identifies a location, in the accessible device, for the data.

6. The bus system according to claim 4, wherein the one of the slave devices is configured to supply, to the accessible device, the address.

7. The bus system according to claim 4, wherein the one of the slave devices is electrically connected between the interconnect unit and the accessible device.

8. The bus system according to claim 4, wherein the accessible device is electrically connected to only the one of the slave devices.

9. The bus system according to claim 4, wherein the one of the slave devices is configured to control, when the one of the slave devices receives the request from the interconnect unit, the accessible device in a manner that commences the transfer.

10. The bus system according to claim 1, further comprising:
another accessible device electrically connected to another of the slave devices.

11. A semiconductor device comprising:
the bus system according to claim 1.

12. An access control method comprising:
electrically connecting master devices to an interconnect unit;
outputting, from one of the master devices to the interconnect unit, a request for a transfer of data between an accessible device and the one of the master devices;
electrically connecting slave devices to the interconnect unit;
receiving, by one of the slave devices from the interconnect unit, the request;
extracting, by the one of the slave devices from the request, an identifier that identifies the one of the master devices;

extracting, by one of the slave devices from the request, transfer mode information that identifies a manner of the transfer; and generating, by one of the slave devices from the identifier and the transfer mode information, a response signal that the one of the slave devices supplies to the one of the master devices.

13. The access control method according to claim 12, further comprising:

outputting, from the one of the slave devices when the manner of the transfer is a non-posted transfer, the response signal to the one of the master devices upon the completion of the transfer.

14. The access control method according to claim 12, further comprising:

outputting, from the one of the slave devices when the manner of the transfer is a posted transfer, the response signal to the one of the master devices when the one of the slave devices receives the request.

15. The access control method according to claim 12, further comprising:

extracting, by the one of the slave devices from the request, an address in the accessible device.

16. The access control method according to claim 15, wherein the address identifies a location, in the accessible device, for the data.

17. The access control method according to claim 15, further comprising:

supplying, from the one of the slave devices to the accessible device, the address.

18. The access control method according to claim 15, wherein the one of the slave devices is electrically connected between the interconnect unit and the accessible device.

19. The access control method according to claim 15, wherein the accessible device is electrically connected to only the one of the slave devices.

20. The access control method according to claim 15, further comprising:

controlling, by the one of the slave devices when the one of the slave devices receives the request from the interconnect unit, the accessible device in a manner that commences the transfer.

* * * * *